United States Patent
Park et al.

(10) Patent No.: US 12,272,120 B2
(45) Date of Patent: Apr. 8, 2025

(54) ENRICHING FEATURE MAPS USING MULTIPLE PLURALITIES OF WINDOWS TO GENERATE BOUNDING BOXES

(71) Applicant: Motional AD LLC, Boston, MA (US)

(72) Inventors: Jongwoo Park, Long Island City, NY (US); Apoorv Sing, Pittsburgh, PA (US); Varun Kumar Reddy Bankiti, Bellevue, WA (US)

(73) Assignee: Motional AD LLC, Boston, MA (US)

( * ) Notice: Subject to any disclaimer, the term of this patent is extended or adjusted under 35 U.S.C. 154(b) by 325 days.

(21) Appl. No.: 17/821,154

(22) Filed: Aug. 19, 2022

(65) Prior Publication Data
US 2024/0062520 A1  Feb. 22, 2024

(51) Int. Cl.
| | |
|---|---|
| G06V 10/77 | (2022.01) |
| B60R 1/28 | (2022.01) |
| G06T 3/00 | (2024.01) |
| G06T 3/16 | (2024.01) |
| G06V 10/26 | (2022.01) |
| G06V 20/56 | (2022.01) |
| H04N 5/262 | (2006.01) |

(52) U.S. Cl.
CPC ............ *G06V 10/7715* (2022.01); *B60R 1/28* (2022.01); *G06T 3/16* (2024.01); *G06V 10/26* (2022.01); *G06V 20/56* (2022.01); *H04N 5/2628* (2013.01); *B60R 2300/607* (2013.01)

(58) Field of Classification Search
CPC .... G06V 10/7715; G06V 10/26; G06V 20/56; B60R 1/28; B60R 2300/607; G06T 3/16; H04N 5/2628
See application file for complete search history.

(56) References Cited

U.S. PATENT DOCUMENTS

| | | | | |
|---|---|---|---|---|
| 9,734,455 | B2* | 8/2017 | Levinson | G01S 17/931 |
| 11,365,976 | B2* | 6/2022 | Colgate | G01C 21/28 |
| 11,593,587 | B2* | 2/2023 | Lee | G06V 10/764 |
| 11,663,294 | B2* | 5/2023 | Liu | G06N 3/0895 |
| | | | | 382/159 |
| 11,966,452 | B2* | 4/2024 | Hotson | G06N 3/04 |
| 12,020,489 | B2* | 6/2024 | Park | G06F 18/251 |

OTHER PUBLICATIONS

Philion, J. et al., "Lift, Splat, Shoot: Encoding Images from Arbitrary Camera Rigs by Implicitly Unprojecting to 3D", Computer Vision and Pattern Recognition, Aug. 2020, arXiv:2008.05711v1, in 17 pages.

(Continued)

*Primary Examiner* — Gregory M Desire
(74) *Attorney, Agent, or Firm* — Knobbe, Martens, Olson & Bear, LLP

(57) ABSTRACT

A perception system may be used to generate bounding boxes for objects in a vehicle scene. The perception system may receive images and feature maps corresponding to the received images. The perception system may generate multiple pluralities of windows and use the multiple pluralities of windows to enrich semantic data of the feature maps. The perception system may use the enriched semantic to generate one or more bounding boxes for objects in the vehicle scene.

20 Claims, 14 Drawing Sheets

(56) References Cited

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Yin, T. et al., "Center-based 3D Object Detection and Tracking", Computer Vision and Pattern Recognition, Jan. 2021, arXiv:2006.11275v2, in 12 pages.
U.S. Appl. No. 17/821,152 **, filed Aug. 19, 2022, Park et al.
Huang, J. et al., "BEVDet: High-Performance Multi-Camera 3D Object Detection in Bird-Eye-View", Arxiv.org, Cornell University Library, Jun. 2022, in 19 pages.
International Search Report and Written Opinion received for PCT Patent Application No. PCT/US2023/072389, mailed on Nov. 24, 2023.

* cited by examiner

ENRICHING FEATURE MAPS USING MULTIPLE PLURALITIES OF WINDOWS TO GENERATE BOUNDING BOXES

RELATED APPLICATIONS

The present application is being filed on Aug. 19, 2022, concurrently with U.S. application Ser. No. 17/821,152, entitled ENRICHING OBJECT QUERIES USING A BIRD'S-EYE VIEW FEATURE MAP TO GENERATE BOUNDING BOXES, which is incorporated herein by reference for all purposes.

BACKGROUND

Self-driving vehicles may generate bounding boxes for object in a vehicle scene using images obtained from one or more image sensors.

DETAILED DESCRIPTION

Figure 1:
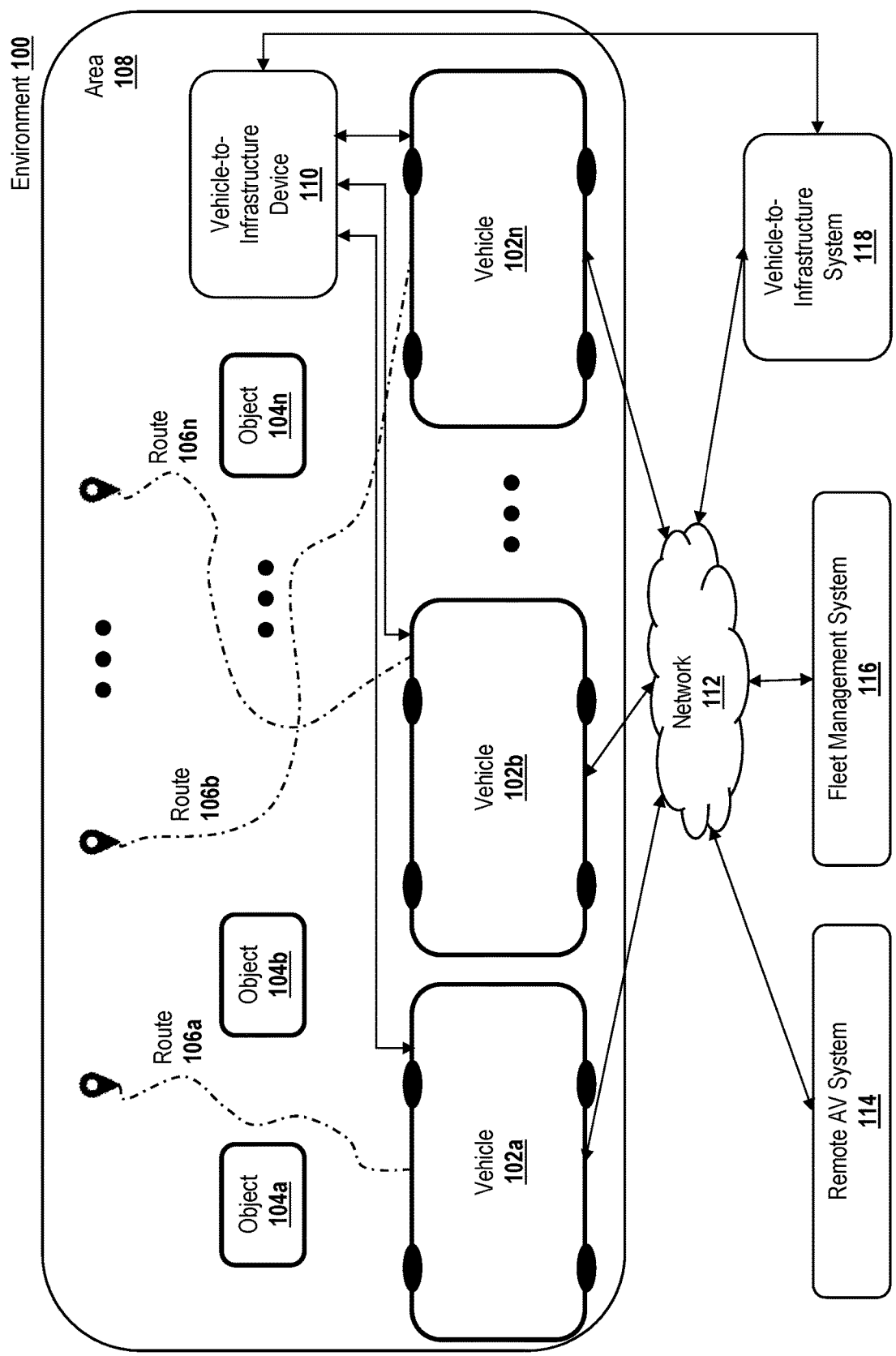
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. Also, the term "or" is used in its inclusive sense (and not in its exclusive sense) so that when used, for example, to connect a list of elements, the term "or" means one, some, or all of the elements in the list. Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. As used herein, the term "if" is, optionally, construed to mean "when," "upon," "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has," "have," "having," or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

Overview

To effectively navigate through various scenes, autonomous vehicles use computer vision to identify objects in a scene and then navigate the scene based on the identified objects. As part of the navigation process, the autonomous vehicles may draw (3D) bounding boxes around objects in images to understand the spatial relationship of the object to the autonomous vehicle.

It can be challenging to draw accurate 3D bounding boxes on objects in a real-time driving environment, in some cases, because a neural network is unable to obtain enough semantic and local information about the objects. Moreover, individual cameras on an autonomous vehicle may not capture an entire object increasing the difficulty of identifying objects in a vehicle scene. As such, individual feature maps corresponding to the different cameras may have insufficient semantic data to enable drawing of an accurate bounding box.

In addition, cross-relating or correlating grid cells of feature maps can be computationally intensive, and correlating grid cells across an entire or multiple feature maps may not be feasible in a real-time driving environment To address these issues, an autonomous vehicle may group grid cells of feature maps and combine or relate features of the grid cells within the group. In certain cases, the grid cells may be grouped based on an outline of an object. In some cases, the grid cells may be grouped using one or more regions or windows that traverse multiple feature maps such that features from grid cells in different feature maps are enriched or cross correlated with each other. Different stages may use a different number, size, or shape of windows and multiple layers with shifted windows may be used to further enrich the grid cells.

By using groups of grid cells (e.g., windows or subsets of images/feature maps) for comparison and enrichment (e.g., for self-attention) instead of an entire feature map or set of feature maps, the autonomous vehicle may decrease processing demands and increase the speed and efficiency of processing the feature maps. These efficiencies can increase the rate at which the autonomous vehicle is able to accurately identify objects in the images. For example, in some cases, self-attention may result in a computational factor of $O^2$. Thus, performing self-attention on a N×M feature map (resulting in computations of $(N \times M)^2$) may be significantly more computationally intensive (taking more time and processing power) than performing self-attention on Y windows of the feature map (resulting in computations of $Y*(N \times M/Y)^2$).

In addition, the enriched grid cells may improve the autonomous vehicle's ability to identify objects within the autonomous vehicle's scene. For example, the enriched feature maps can improve the autonomous vehicle's ability to determine bounding boxes and/or the enriched feature maps may be used to enrich object queries and/or generate a BEV feature map that improve the autonomous vehicle's ability to determine bounding boxes.

The autonomous vehicle may also generate object queries and enrich the object queries using: the (enriched) feature maps, features from other object queries (similar to the way in which grid cells of the feature maps are enriched), and/or features from a bird's-eye view (BEV) feature map (which in turn may be generated from the original feature maps generated by an image feature extractor or from the enriched feature maps). The enriched object queries may improve the autonomous vehicle's ability to identify objects within the autonomous vehicle's scene.

General Overview

By virtue of the implementation of systems, methods, and computer program products described herein, an autonomous vehicle can more accurately identify objects within an image, more accurately identify the location of identified objects within the image, more accurately predict trajectories of identified objects within the image, determine additional features for identified objects, and infer additional information about the scene of an image.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
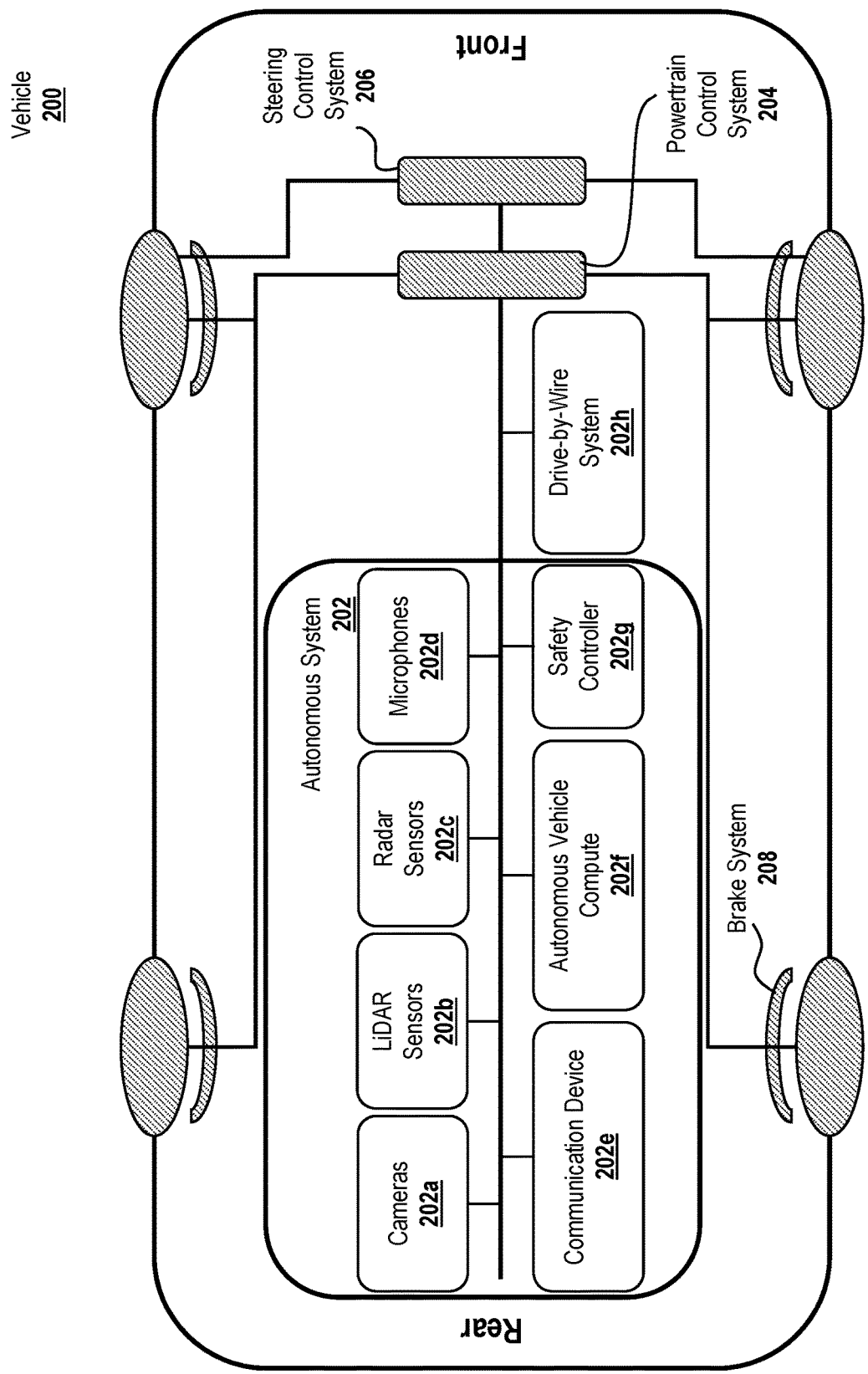
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
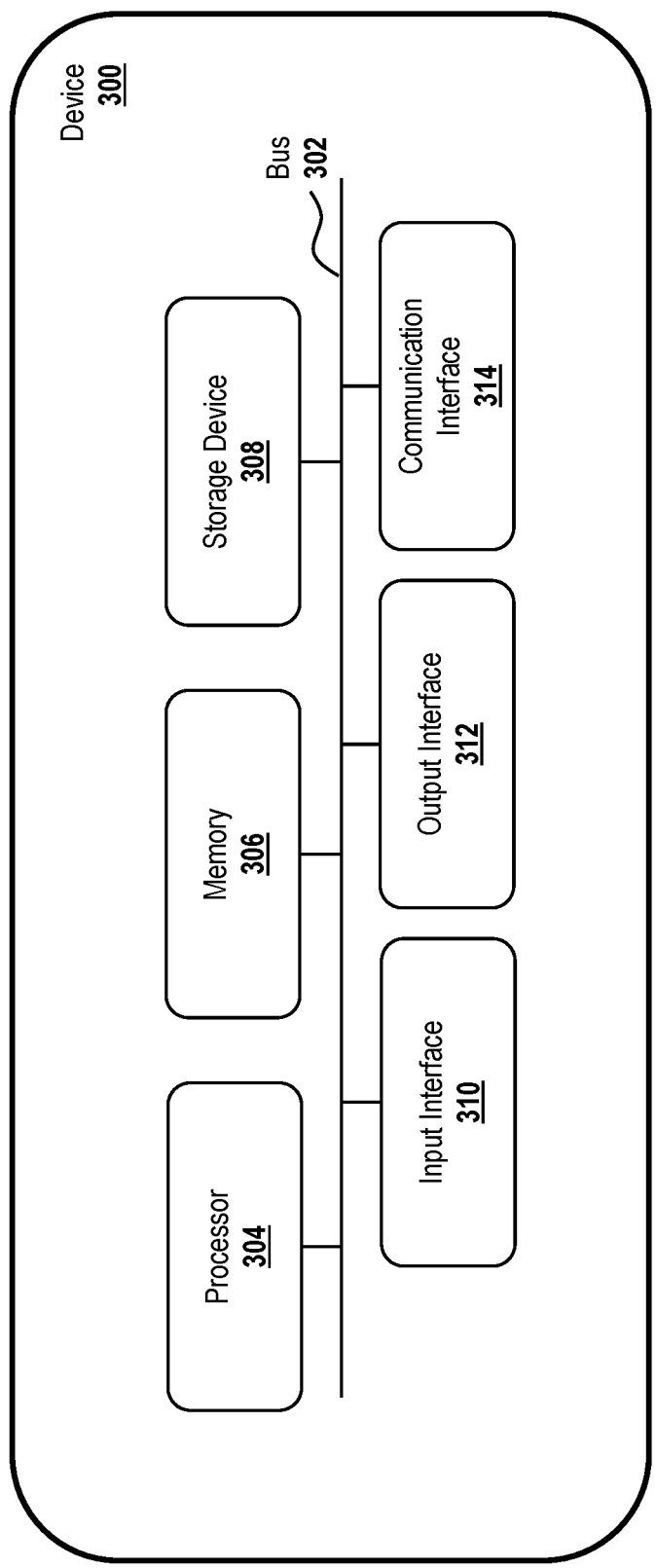
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 306 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
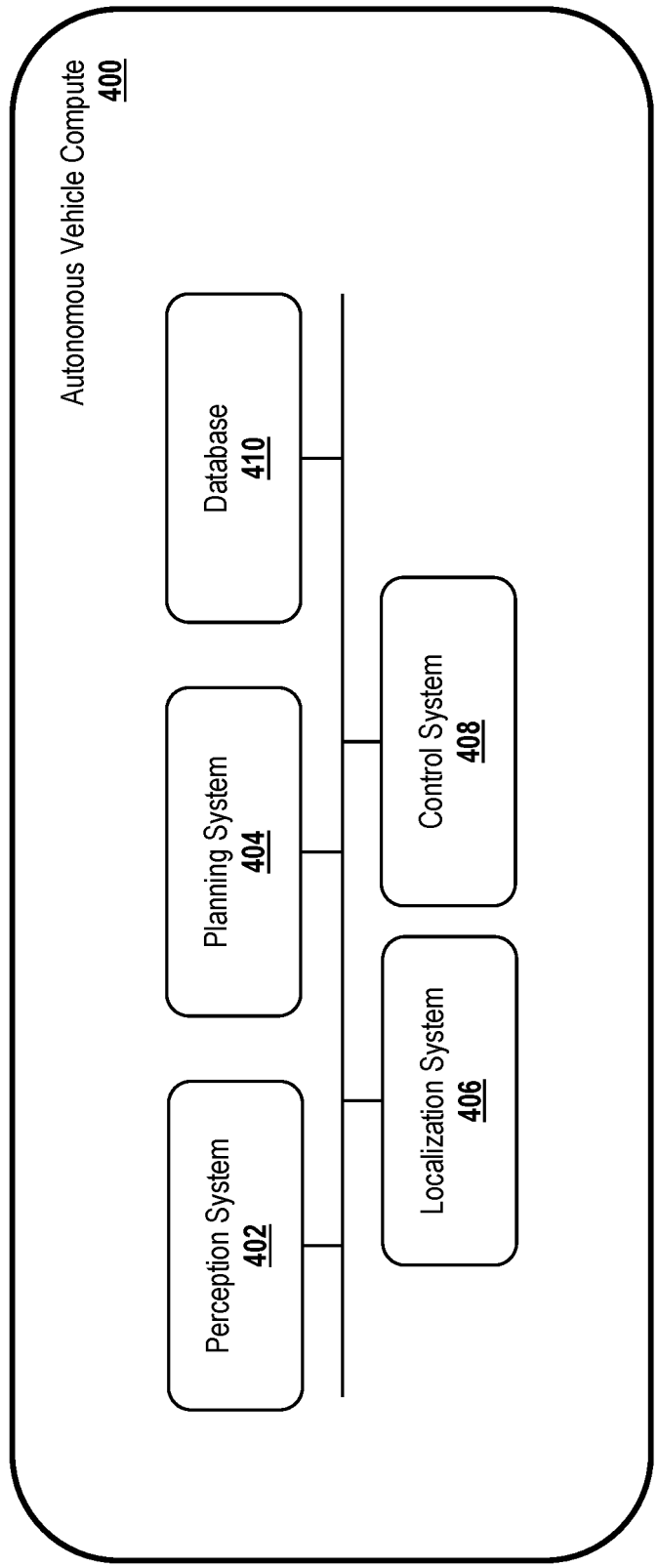
FIG. 4A is a diagram of certain components of an autonomous system.
Figure 4B:
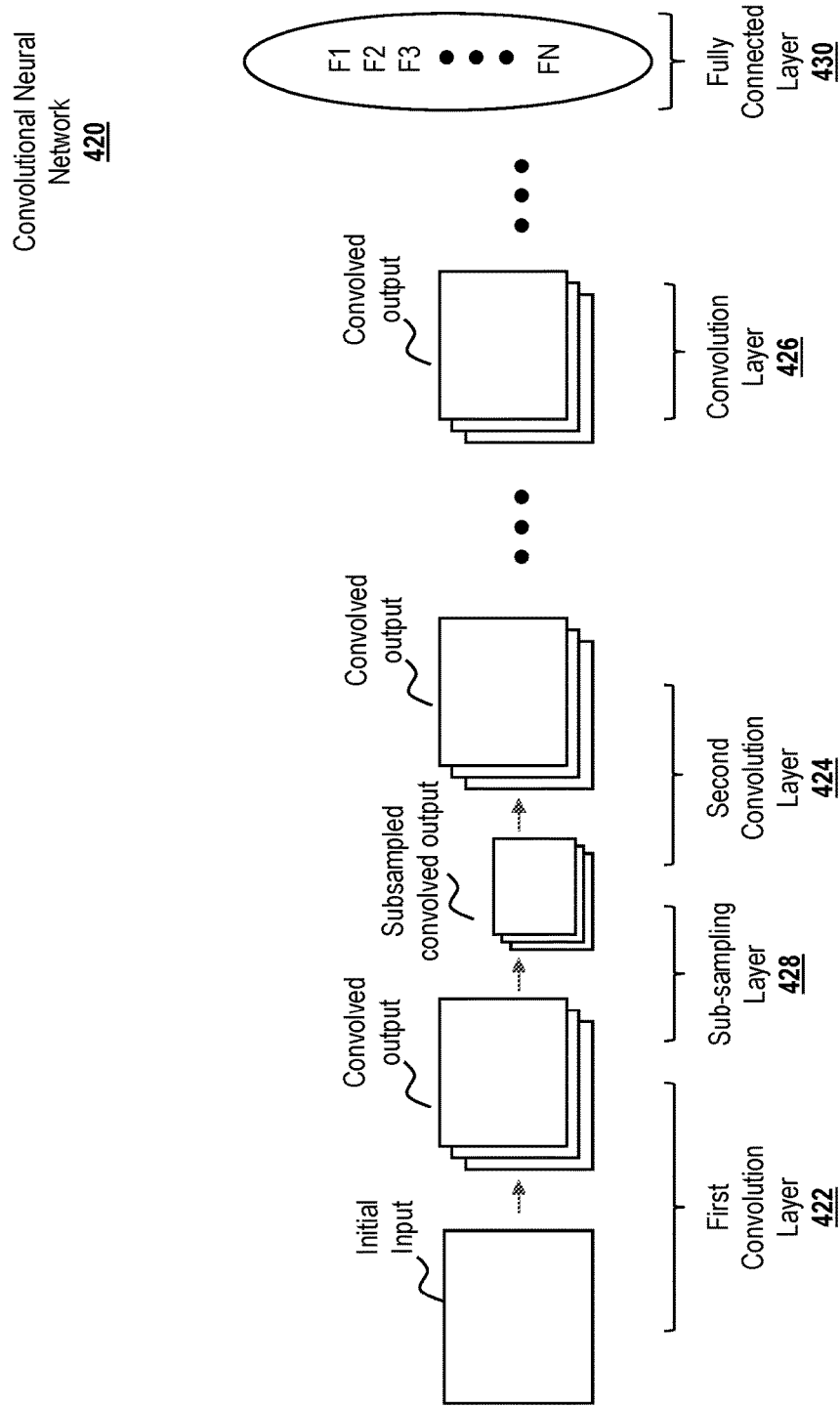
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of subsampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
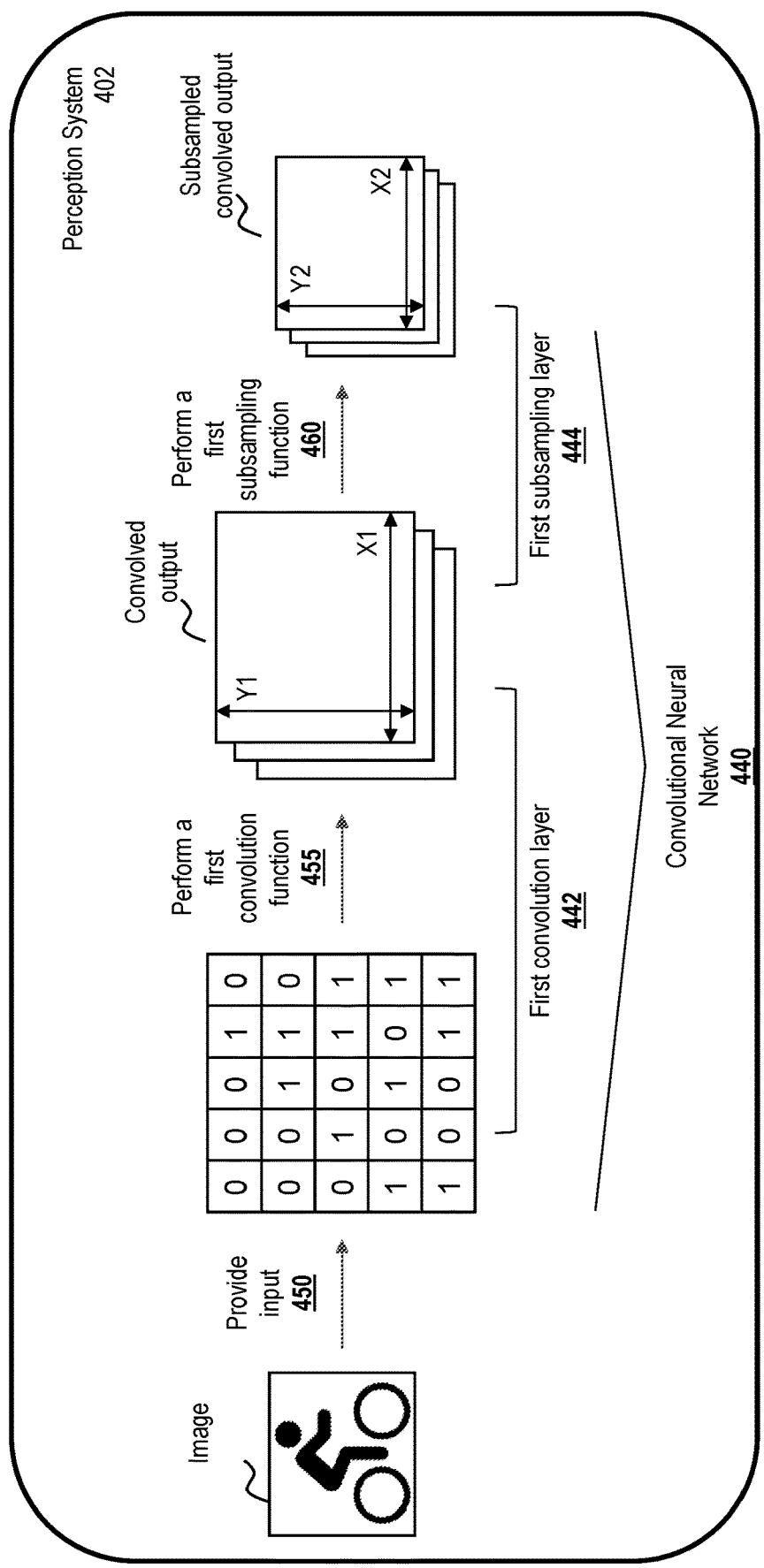
FIGS. 4C and 4D are a diagram illustrating example operation of a CNN.
Figure 4D:
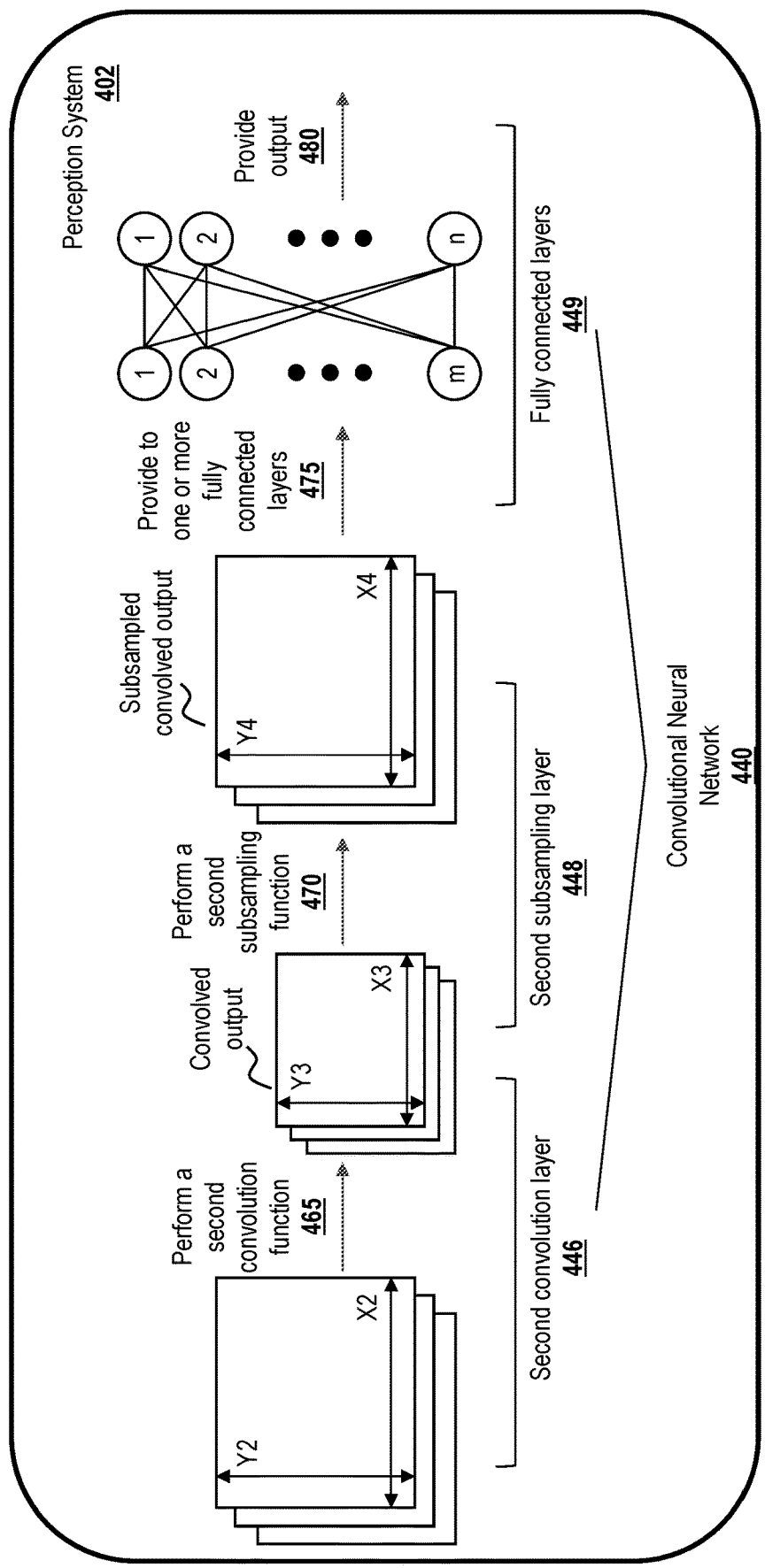

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Generating Bounding Boxes for Navigation

As described herein, to improve the functionality of an autonomous vehicle and its ability to generate bounding boxes and navigate environments in real-time, an autonomous vehicle may be configured to group grid cells of feature maps and combine or relate features of the grid cells within the group. In certain cases, the grid cells may be grouped based on an outline of an object. In some cases, the grid cells may be grouped using one or more regions or windows that traverse multiple feature maps such that features from grid cells in different feature maps are enriched or cross correlated with each other. Different stages may use a different number, size, or shape of windows and multiple layers with shifted windows may be used to further enrich the grid cells.

By grouping grid cells into subsets of feature maps, the autonomous vehicle can cross-relate and correlate the features of the grid cells using fewer compute resources, which can increase the speed of a self-attention process and the speed of enriching feature maps.

Moreover, the enriched feature maps may improve the autonomous vehicle's ability to identify objects within the autonomous vehicle's scene. For example, the enriched grid cells can improve the autonomous vehicle's ability to determine bounding boxes for objects in a vehicle scene.

The autonomous vehicle may also generate object queries and enrich the object queries using: the (enriched) feature maps, features from other object queries (similar to the way in which grid cells of the feature maps are enriched), and/or features from a bird's-eye view (BEV) feature map. The enriched object queries may improve the autonomous vehicle's ability to identify objects within the autonomous vehicle's scene.

Figure 5A:
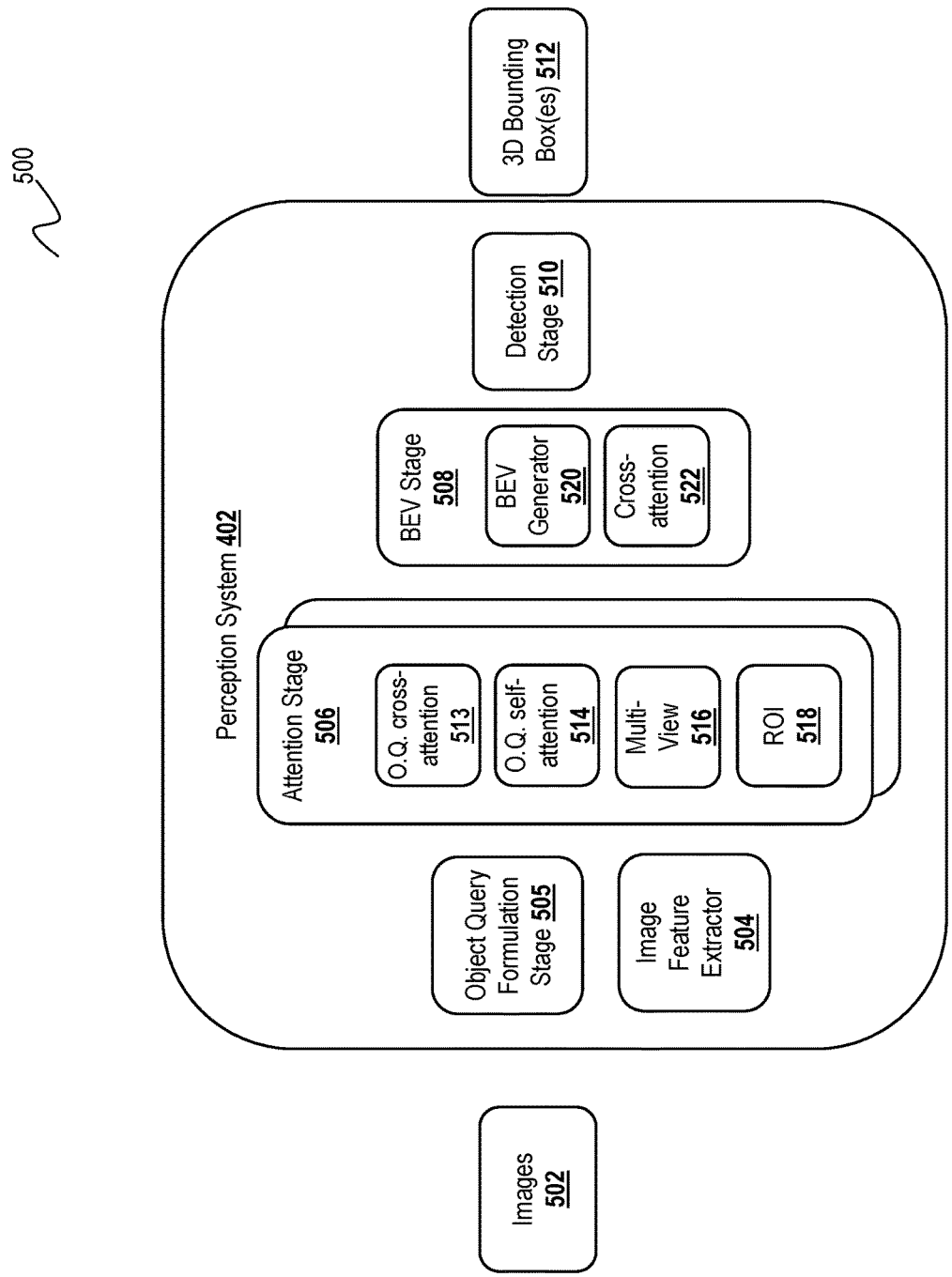
FIG. 5A is a block diagram illustrating an example perception environment in which the perception system receives and processes images to provide one or more (3D) bounding boxes for objects in a vehicle scene.

FIG. 5A is a block diagram illustrating an example perception environment 500 in which the perception system 402 receives and processes images 502 to provide one or more (3D) bounding boxes 512 for objects in a vehicle scene (corresponding to the images 502). In the illustrated example, the perception system 402 includes an image feature extractor 504, an attention stage 506, a BEV stage 508, and a detection stage 510. However, it will be understood that the perception system may include fewer or more components. In some cases, the perception system 402 may omit the BEV stage 508. For example, in some cases, the attention stage 506 may output one or more object queries and may not output feature maps. In some such cases, the object would not be correlated with the feature maps by the BEV stage 508. The various components of the perception system 402 described herein may be implemented using one or more processors and/or as one or more layers or stages of a machine learning model or neural network.

The images 502 for a particular scene (also referred to herein as a set of images 502) may include image data from one or more sensors in a sensor suite. The images 502 may include different types of images corresponding to the sensor or device used to generate them. For example, the images 502 may be camera images generated from one or more cameras, such as cameras 202a, or lidar images generated from one or more lidar sensors, such as lidar sensors 202b. Other image types can be used, such as radar images generated from one or more radar sensors (e.g., generated from radar sensors 202c). Each image may correspond to a different image sensor (or camera) that is placed at a different location around an ego vehicle. In some cases, the combination of images can form a 360-degree view of a scene of an ego vehicle from the perspective of the ego vehicle. As such, each image of the images 502 may be neighbor or border another of the images 502 and some objects (or parts of an object) may show up in different images of the images 502.

Moreover, the images 502 of a set of images may be generated at approximately the same time and may form part of a stream of different images. As such, the images 502 may represent the scene of a vehicle at a particular time. As the perception system 402 uses the images to generate bounding boxes 512 and navigate a vehicle, it will be understood that the perception system 402 may process the images 502 in real-time or near real-time to generate the bounding boxes 512.

The image feature extractor 504 may be implemented using one or more neural networks or layers of a neural network to extract features from the images 502. In some cases, the image feature extractor 504 may be implemented using backbones with a feature pyramid network (FPN), residual networks (Resnet), or Swin transformer, CSWin transformer, etc. The image feature extractor 504 may generate one or more feature maps using the images 502. In some cases, the image feature extractor 504 generates at least one feature map for each of the images 502. For example, if the image feature extractor 504 receives six images corresponding to six cameras placed at different locations around the vehicle and oriented in different ways (e.g., to obtain a 360-degree view of the area around the vehicle), the image feature extractor 504 may generate six feature maps, respectively.

The feature maps may have the same or different shapes from the images used to generate them and/or from each other. For example, if each of the images 502 has the shape [900, 1600, 3], respective feature maps may have the shape [45, 80, 256], however, it will be understood that the feature maps may have different shapes from each other.

Each feature map of the generated feature maps may include an array of grid cells having a particular channel depth. The grid cells may include semantic data (or features) extracted from (pixels in) the image(s) from which the feature map was generated. The features of a grid cell may be organized as a vector or some other tensor shape. For example, the features (or semantic data) of a grid cell may indicate a shape, light, texture, reflectivity, edge, object class, location, etc. of something detected by the image feature extractor 504.

Object Query Initialization Stage

The object query formulation stage 505 (also referred to herein as the formulation stage 505) may be used to initialize, seed/modify, and/or enrich object queries. Accordingly, it will be understood that the formulation stage 505 may include one or more substages, including but not limited to an initialization stage, a seeding/modifying stage, and/or an enrichment stage.

In some cases, the formulation stage 505 may initiate a particular number of object queries. In certain cases, the formulation stage 505 initiates more object queries than a number of objects expected to be found in the image(s) 502. For example, if the formulation stage 505 expects there to be no more than 400 objects in a scene of the images 502, the formulation stage 505 may initiate some number greater than 400 object queries, such as 900 object queries.

The object queries may be organized as a vector or some other tensor shape and/or may include the same or a different number of features. For example, an object query may include 256 dimension features, or fewer or more dimension features. The features, alone or in combination, may represent one or more characteristics of an object, such as, but not limited to, its class, movement, relation to other objects, whether it is foreground or background, location, shape, size, color, texture, reflectivity, etc. In some cases, the formulation stage 505 may initiate the features of an object query randomly and/or pseudo-randomly. For example, the values for the features of the object queries may include random or pseudo-random numbers.

In addition, the formulation stage 505 may seed or modify the initial (random or pseudo-random) values for the features of an object query. In some cases, the formulation stage 505 may include a localization network (or receive values from a localization network) that determines (or helps determine) a probable location of the respective object queries within the vehicle scene. In certain cases, the formulation stage 505 may use other data to seed object queries (or modify the initial values of the object queries). For example, the formulation stage 505 may use heat maps that indicate expected or probable movements or trajectories of objects within the vehicle scene to formulate the object queries. In some cases, the formulation stage 505 may include an object cross-attention stage (similar to the object query cross-attention stage 513 described herein) that correlates object queries with data from one or more grid cells of one or more feature maps generated by the image feature extractor 504. As part of correlating the object query with one or more grid cells, the formulation stage 505 may use one or more linear layers to identify one or more grid cells in one or more feature maps. For example, the formulation stage 505 may multiply a tensor [1, N] corresponding to the object query by a learnable linear layer matrix [N, 2] to determine a location in the feature map that corresponds to a grid cell to be correlated with the object query. The formulation stage 505 may use the features of the grid cell to modify some or all of the features of the object query. In some cases, this may include assigning a weight to a particular feature of the object query and a weight to a corresponding feature of the identified grid cell and using the result (non-limiting example: sum of the products) to modify or assign a new value to the particular feature of the object query. In certain cases, the formulation stage 505 may use a learnable linear layer matrix to identify multiple grid cells of one or more feature maps, and use the identified grid cells to modify the features of the object query. In some such cases, the formulation stage 505 may assign different weights to the features of the different grid cells and use the weighted features to determine a corresponding feature of the object query.

In certain cases, the formulation stage 505 may include an object query self-attention stage (e.g., similar to the object query self-attention stage 514 described herein) that enables the object queries to self-attend and update themselves. For example, the self-attention stage of the formulation stage 505 may modify the values of a group of object queries based on the features of the object queries in the group of object queries. As described herein at least with reference to the object query self-attention stage 514, the object query self-attention stage of the formulation stage 505 may compare the features of a particular object query with the features of some or all of the other object queries (or some or all of the object features of a group of object features) to determine a correlation or similarity between the particular object query and the other object queries, use the correlation between the particular object query and the other object queries to weight the features of the various object queries, and use the weighted features to calculate a new (or modified) value for the respective features of the particular object query. In some cases, the object query self-attention stage 514 may update the features of some or all of the object queries in this way. In certain cases, the object query self-attention stage 514 may determine a matrix to indicate the relationship (or weight) between the features of the various object queries and use the matrix to update the features of some or all of the object queries. The attention stage 506 may be used to enrich feature maps and object queries. In certain cases, the attention stage 506 may enrich feature maps and object queries using self-attention and/or cross-attention techniques.

In the illustrated example, the attention stage 506 includes one or more layers of an object query cross-attention stage 513, an object query self-attention stage 514, a multi-view self-attention stage 516 (also referred to herein as the multi-view stage 516), and/or a region of interest (ROI) self-attention stage 518 (also referred to herein as the ROI stage 518).

Attention Stage

Different layers of the attention stage 506 may include similar components. In the illustrated example of FIG. 6, a layer of the attention stage 506 includes an object query cross-attention stage 513, an object query self-attention stage 514, a multi-view stage 516, and a ROI stage 518, however, it will be understood that the attention stage 506 and/or different layers of the attention stage 506 may include different components. For example, the attention stage 506 and/or different layers of the attention stage 506 may include different components or different relationships between (e.g., the ROI stage 518 may be placed in front of the multi-view stage 516, etc.). In some cases, each layer of the attention stage 506 includes the same components in the same relationship. In certain cases, the layers of the attention stage 506 the components of the different layers may be configured differently or use different parameters. For example, the multi-view stage 516 of a first layer may use different parameters or configurations for processing a feature map than the multi-view stage 516 of a second layer. Similarly, different parameters may be used in different layers for the object query cross-attention stage 513, the object query self-attention stage 514, and/or the ROI stage 518, etc.

The components of a layer of the attention stage 506 may process data in parallel or sequentially. In some cases, the output of a stage within a layer may be used as the input to another stage within the layer. For example, in the illustrated example of FIG. 6, the object query self-attention stage 514 processes data output by the object query cross-attention stage 513, the object query cross-attention stage 513 processes data output by the ROI stage 518, and the ROI stage 518 processes data output by the multi-view stage 516. However, it will be understood that the components of the attention stage 506 may be aligned in a variety of configurations. For example, the multi-view stage 516 may be configured to process the output of the ROI stage 518.

The output of one layer of the attention stage 506 may be used as the input to a subsequent layer and the output of the last layer of the attention stage 506 may be provided to the BEV stage 508 and/or the detection stage 510. For example, in an N-layer attention stage 506, the output of the first layer may be used as the input of the second layer and so on until the output of the N−1 layer is used as the input of the Nth layer. In some such cases, the output of the Nth layer may be used as the input to the BEV stage 508 and/or the detection stage 510.

Object Query Cross-Attention Stage

The object query cross-attention stage 513 may be configured to enrich (a set of) object queries (e.g., using cross-attention and/or using data from another stage, such as the multi-view stage 516 and/or the ROI stage 518, described in greater detail below).

In some cases, the object query cross-attention stage 513 may enrich object queries based on data received from the multi-view stage 516 and/or the ROI stage 518. For example, the object query cross-attention stage 513 may use semantic data corresponding to one or more grid cells in one or more feature maps output by the multi-view stage 516 and/or the ROI stage 518 to modify or edit the object query. In some cases, this may include modifying one or more features of a tensor corresponding to the object query.

In some cases, the object query cross-attention stage 513 may correlate data from one or more grid cells of one or more (enriched) feature maps enriched by the multi-view stage 516 and/or the ROI stage 518. As part of correlating the object query with one or more grid cells, the object query cross-attention stage 513 may use one or more linear layers to identify one or more grid cells in one or more (enriched) feature maps. For example, the object query cross-attention stage 513 may multiply a tensor [1, N] corresponding to an object query by a learnable linear layer matrix [N, 2] to determine a location (x, y) in an (enriched) feature map that corresponds to a grid cell to be correlated with the object query.

The object query cross-attention stage 513 may use the features of the identified grid cell to modify some or all of the features of the object query. In some cases, this may include assigning a weight to a particular feature of the object query and a weight to a corresponding feature of the identified grid cell and using the result (non-limiting example: sum of the products) to modify or assign a new value to the particular feature of the object query. In certain cases, the object query cross-attention stage 513 may use a learnable linear layer matrix to identify multiple grid cells of one or more feature maps, and use the identified grid cells to modify the features of the object query. In some such cases, the object query cross-attention stage 513 may assign different weights to the corresponding features of the different grid cells and use the weighted features to determine a corresponding feature of the object query.

Object Query Self-Attention Stage

The object query self-attention stage 514 may be configured to generate and/or enrich object queries (e.g., using self-attention) using features from a group of object queries.

As described herein, there may exist many object queries and some or all of the object queries may be modified by the object query cross-attention stage 513 (e.g., using grid cells from the (enriched) feature maps). In some cases, the object query self-attention stage 514 may modify or enrich the object queries by comparing the features of the object queries with each other, determining a weighting value based on the comparison and modifying the features of the object query using weighted features (weighted based on the determined weighting value). For example, the object query self-attention stage 514 may compare semantic data (or features) of an object query to determine a relationship between the object queries, such as a likelihood that the different object queries correspond to the same object or to different objects. In some cases, this may include comparing features of the object query that correspond to an object's class, movement, relation to other objects, whether it is foreground or background, color, light reflectivity, edge, texture, shape, etc. Based on the comparison, the object query self-attention stage 514 may update the object queries. In some cases, this may include modifying one or more values of a tensor corresponding to an object query.

In some cases, the object query self-attention stage 514 compares the features of a particular object query with the features of some or all of the other object queries (or some or all of the object features of a group of object features) to determine a correlation or similarity between the particular object query and the other object queries. In some cases, the correlation or similarity can be represented as a probability or weight. Using the correlation between the particular object query and the other object queries, the features of the object queries (include the particular object query) may be weighted and the weighted features may be used to calculate a new (or modified) value for the respective features of the particular object query. For example, a first feature of some or all of the object queries may be weighted (relative to the particular object query) and the weighted values used to determine a value for the first feature of the particular object query. Similarly, the other features of the particular object query may be updated (e.g., using the same or a different weighting). In some cases, the object query self-attention stage 514 may update the features of some or all of the object queries in this way. In certain cases, the object query self-attention stage 514 may determine a matrix to indicate the relationship (or weight) between the features of the various object queries and use the matrix to update the features of some or all of the object queries.

As a non-limiting example, consider the following three object queries and values for their features: Object query1 [1,4]=(0.2, 0.2, 0.4, 0.7); Object query2 [1,4]=(0.3, 0.4, 0.6, 0.7); Object query3 [1,4]=(0.1, 0.8, 0.9, 0.7).

After analyzing the features of the three object queries, assume that the object query self-attention stage 514 generates the following relationship (or weighting) matrix between them:

|                | Object Query 1 | Object Query 2 | Object Query 3 |
|----------------|----------------|----------------|----------------|
| Object Query 1 | .7             | .2             | .1             |
| Object Query 2 | .2             | .6             | 0.2            |
| Object Query 3 | .1             | .2             | .7             |

Based on the determined relationship or weighting, the object query self-attention stage 514 may update the values for the features of the object queries as follows:

[1,4]=(0.21,0.3,0.49,0.7) or (0.7*0.2+0.2*0.3+
0.1*0.1,0.7*0.2+0.2*0.4+0.1*0.8,0.7*0.4+
0.2*0.6+0.1*0.9,0.7*0.7+0.7*0.2+0.7*0.1).      Object query1

[1,4]=(0.24,0.44,0.62,0.7) or (0.2*0.2+0.6*0.3+
0.2*0.1,0.2*0.2+0.6*0.4+0.2*0.8,0.2*0.4+
0.6*0.6+0.2*0.9,0.2*0.7+0.6*0.7+0.2*0.7.      Object query2

[1,4]=(0.15,0.66,0.79,0.7) or (0.1*0.2+0.2*0.3+
0.7*0.1,0.1*0.2+0.2*0.4+0.7*0.8,0.1*0.4+
0.2*0.6+0.7*0.9,0.1*0.7+0.2*0.7+0.7*0.7      Object query3

Multi-View Stage

The multi-view stage 516 may enrich feature maps by comparing and/or correlating features from different grid cells of the feature maps. In some cases, the multi-view stage 516 uses the features from grid cells in a group of grid cells to update each other (also referred to herein as self-attention). For example, the multi-view stage 516 may use features of a group of grid cells in one or more feature maps to enrich or modify features of a particular grid cell in the group of grid cells.

In certain cases, the multi-view stage 516 may group grid cells based on objects (e.g., group grid cells that correspond (or appear to correspond) to the same object or to an outline of the same object). In some cases, the multi-view stage 516 may group grid cells by dividing a feature map into multiple regions (also referred to herein as windows) and/or assign different grid cells of a feature map to the different regions or windows. In certain cases, the different regions or windows of the feature map may be mutually exclusive (e.g., a grid cell may be assigned to only one region or window). In certain cases, the multi-view stage 516 may divide the feature map into multiple rows or columns of regions or windows. Some or all of the regions or windows may have the same (or different) sized (e.g., width and height), and one or more of the regions may overlap with multiple feature maps corresponding to different images. The rows of windows may be aligned or offset from each other.

As described herein, by using groups of grid cells (e.g., windows or subsets of images/feature maps) for comparison and enrichment (e.g., for self-attention) instead of an entire feature map or set of feature maps, the attention stage 506 may decrease processing demands and increase the speed and efficiency of processing the feature maps by the attention stage 506. These efficiencies can increase the rate at which the perception system 402 is able to accurately identify objects in the images 502.

Figure 5B:
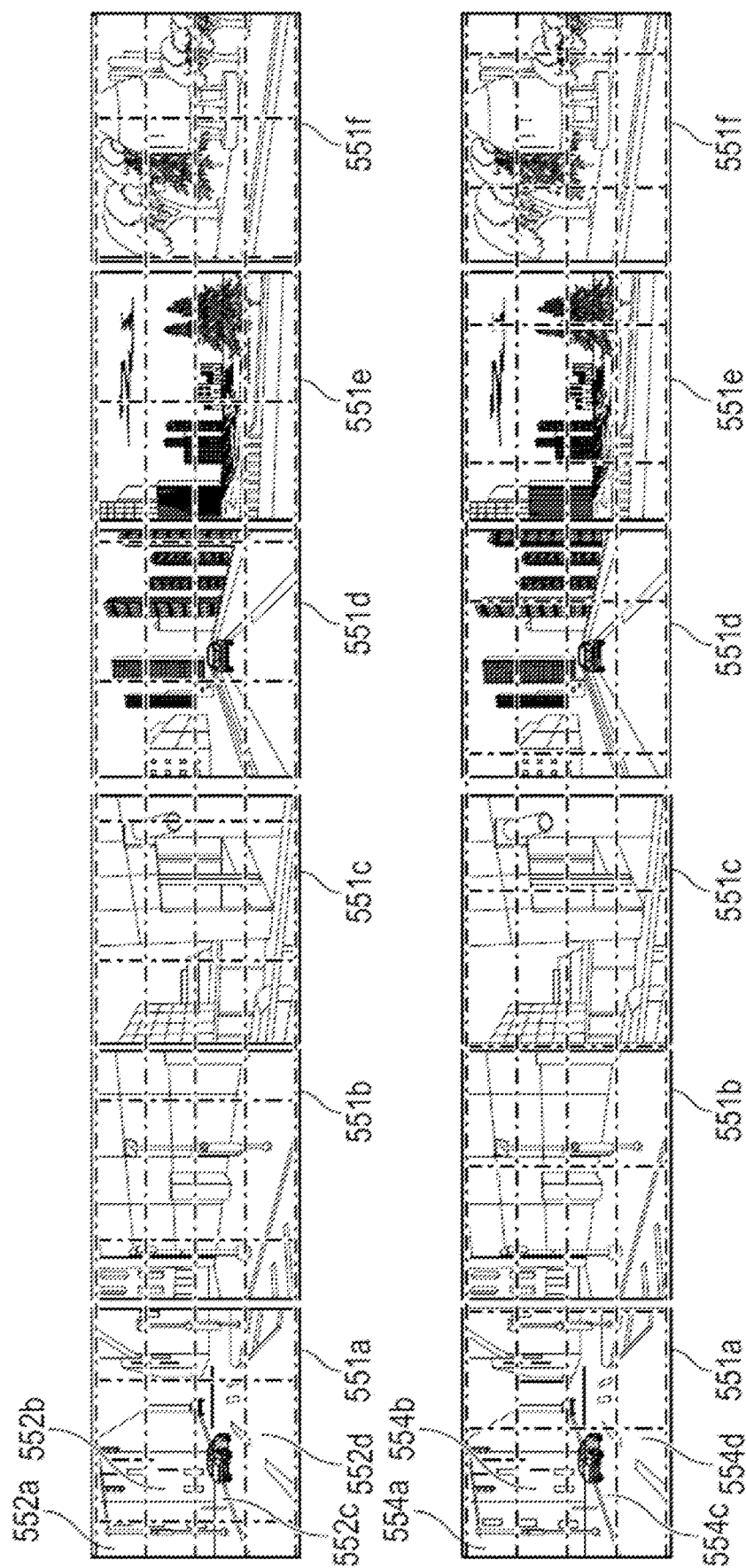
FIG. 5B is a diagram illustrating an example of rows of windows applied to feature maps corresponding to different images.

FIG. 5B is a diagram illustrating an example of rows of windows 552 (individual windows referred to as 552a, 552b, 552c, etc.) applied to feature maps 551 (individual feature maps referred to as 551a-551f) corresponding to different images (received from different images sensors). In the illustrated example, the regions are equally sized and each row is aligned with the row above and below. However, it will be understood that different sized windows may be used and/or the row may be offset from each other. In some cases, each row may be offset from another row. In certain cases, alternating rows may be aligned with intermediate rows offset (e.g., like rows of bricks). In addition, as illustrated in FIG. 5B, the windows 552 may overlap across multiple feature maps. For example, the window 552a includes grid cells from the feature map 551a and the feature map 551f.

The multi-view stage 516 may compare semantic data of groups of grid cells (e.g., different grid cells within a particular window or region) with each other. Based on the comparison, the multi-view stage 516 may modify the semantic data of the different grid cells. For example, the multi-view stage 516 may compare certain features of a grid cell (e.g., color, reflectivity, shape, etc.) with corresponding features of a different grid cell in the same group (e.g., compare features of a grid cell within window 552a with corresponding features of a different grid cell within the window 552a). Based on a similarity, the multi-view stage 516 may determine a probabilistic relationship between the grid cells in the group (e.g., probability that the grid cells are part of the same object, such as a vehicle, bicycle, pedestrian, construction cone, etc.). Based on this determination, the multi-view stage 516 may update one or more features of the grid cells. For example, one grid cell may be updated to indicate that it is the middle portion of an object and another grid cell may be updated to indicate that it is the beginning of the same object, etc.

In certain cases, the multi-view stage 516 may cross correlate some or all of the features of the various grid cells within a group (e.g., within a particular region) to each other. In this way, the multi-view stage 516 may enrich some or all of the grid cells within the particular group. Moreover, the multi-view stage 516 may repeat the comparison for each of the groups (e.g., windows) of a feature map and/or across some or all of the feature maps such that some or all grid cells of the feature maps are compared/updated based on comparisons with features from other grid cells in the same group (e.g., window or region).

As described above, with reference to the self-attention of object queries, in some cases, the multi-view stage 516 may generate a matrix that includes some or all of the grid cells within a group. The multi-view stage 516 may then determine a weight or probabilistic relationship between the grid cells and include the weight in the matrix. The multi-view stage 516 may use the weights/relationships in the matrix (indicative of a relationship or weight between grid cells) to calculate updated values for the features of the different grid cells. For example, the multi-view stage 516 may update a particular value of a particular grid cell using corresponding weighted values of some or all of the other grid cells in the group. An example of such a matrix and calculation (but for object queries) is described herein with reference to the self-attention of object queries. Moreover, this process may be repeated across some or all of the groups of grid cells of a feature map and across some or all of the feature maps. For example, the image feature extractor 504 may generate multiple feature maps for each image with each feature map corresponding to one or more detected characteristics of the image. In some such cases, the windows (or other form of grouping) may be applied to some or all of the feature maps and the grid cells of the feature maps updated as described herein.

In some cases, the attention stage 506 may include multiple layers of the multi-view stage 516. In some such cases, the groups (e.g., windows) in the different layers of the multi-view stage 516 may be different. In some cases, the windows may be sized and/or positioned differently. For example, as illustrated by the windows 554 (individual windows referred to as 554a, 554b, 554c, etc.) on feature maps 551 of FIG. 5B, the windows 554 in a second layer of an attention stage 506 may be offset from the windows 552 in the first layer of the attention stage 506.

In certain cases, where the windows in different layers are offset from each other, alternating layers may use the same or different positions. For example, in an attention stage 506 with six layers, the odd numbered layers (e.g., layers one, three, and five) may be aligned similar to the rows of windows 552 shown in FIG. 5B and the even numbered layers (e.g., layers two, four, and six) may be aligned similar to the rows of windows 554 (individual windows referred to as 554a, 554b, 554c, etc.) shown in FIG. 5B.

It will be understood, however, that the windows in the different layers may be offset from each other as desired. In some cases, each layer may have a different offset from the other layers. In certain cases, every second, third, fourth, (or other quantity) of layers may have the same offset of the windows, etc. In the illustrated example of FIG. 5B, the different layers are offset from each other unidirectionally (horizontally), however, it will be understood that the different layers may be offset from each other in other directions (e.g., vertically) and/or in multiple directions (e.g., horizontally and vertically).

By offsetting windows (or changing groups) in different layers, the attention stage 506 may improve the enrichment of the (grid cells of the) feature maps. For example, as grid cells within window 552a are compared and used to enrich each other at one layer, those enrichments may be propagated to grid cells within the window 554a in a subsequent layer. In this way enrichments may be propagated across the feature maps/images.

Region of Interest (ROI) Stage

The ROI stage 518 may enrich feature maps by comparing and/or correlating features from different grid cells of the feature maps. In some cases, the ROI stage 518 uses the features from grid cells in a group of grid cells (such as grid cells in a window) to update each other (also referred to herein as self-attention). For example, the ROI stage 518 may use features of a group of grid cells in one or more feature maps to enrich or modify features of a particular grid cell in the group of grid cells.

In certain cases, the ROI stage 518 may group grid cells based on objects (e.g., group grid cells that appear to correspond to the same object or to an outline of the same object). In some cases, the ROI stage 518 may group grid cells by dividing a feature map into multiple regions or windows and/or assigning different grid cells of a feature map to different regions or windows, similar to the multi-view stage 516 but using differently shaped or differently sized regions or windows. In certain cases, the different regions or windows in a layer of the ROI stage 518 may be mutually exclusive (e.g., a grid cell of a feature map may be assigned to only one region or window). In certain cases, the ROI stage 518 may divide the feature map into multiple rows or columns of regions or windows. Some or all of the regions or window may be equally (or differently) sized, and one or more of the regions may overlap with multiple feature maps corresponding to different images. The rows or columns may be aligned or offset from each other.

As described herein, by using groups of grid cells, windows, or subsets of images or feature maps for comparison and enrichment, the attention stage 506 may decrease processing demands and increase the speed and efficiency of processing the feature maps by the attention stage 506. These efficiencies can increase the rate at which the perception system 402 is able to accurately identify objects in the images 502.

Figure 5C:
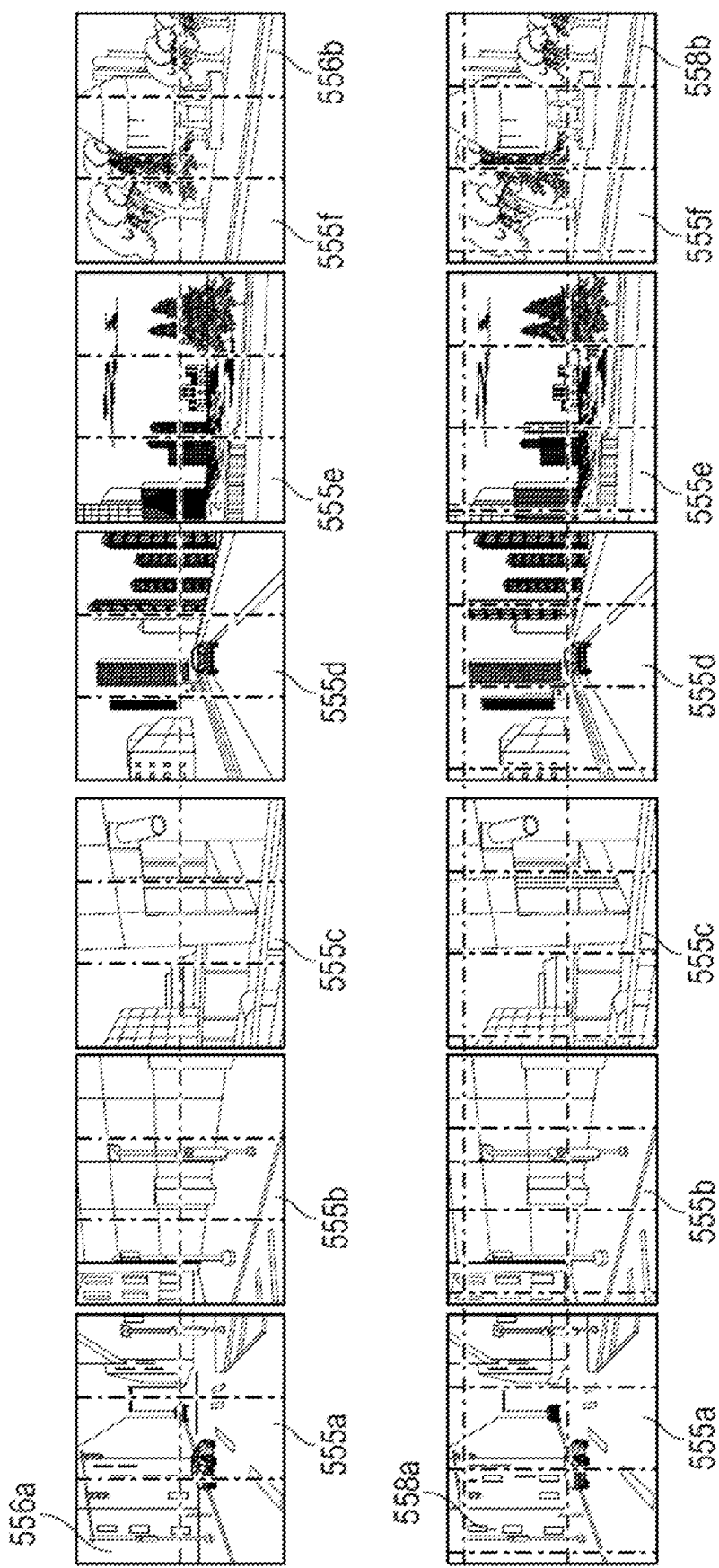
FIG. 5C is a diagram illustrating an example of columns of windows applied to feature maps corresponding to different images.

FIG. 5C is a diagram illustrating an example of columns of windows 556 (individually referred to as window 556a, 556b, etc.) applied to feature maps 555 (individual feature maps referred to as 555a-555f) corresponding to different images (received from different images sensors). In the illustrated example, the windows 556 are equally sized and each column is aligned with the column to the left and right. However, it will be understood that different sized windows may be used and/or the columns may be offset from each other. In some cases, each column may be offset from another column. In certain cases, alternating columns may be aligned with intermediate columns offset (e.g., like rows of bricks).

The ROI stage 518 may compare semantic data of groups of grid cells (e.g., different grid cells within a particular window or region) with each other. Based on the comparison, the ROI stage 518 may modify the semantic data of the different grid cells. For example, the ROI stage 518 may compare certain features of a grid cell (e.g., color, reflectivity, shape, edge, etc.) with corresponding features of a different grid cell in the same group (e.g., compare features of a grid cell within window 556a with corresponding features of a different grid cell within the window 556a). Based on a similarity, the ROI stage 518 may determine a probabilistic relationship between the grid cells in the group (e.g., probability that the grid cells are part of the same object, such as a vehicle, bicycle, pedestrian, construction cone, etc.). For example, one grid cell may be updated to indicate that it is the middle portion of an object, and another grid cells may be updated to indicate that it is the beginning of the same object. As another non-limiting example, one grid may be updated to indicate that it is moving 60 m/s, and another grid cells may be updated to indicate that it is moving 10 m/s, etc.

In certain cases, the ROI stage 518 may cross correlate some or all of the features of the various grid cells within a group (e.g., within a particular region) to each other. In this way, the ROI stage 518 may enrich some or all of the grid cells within the particular group. Moreover, the ROI stage 518 may repeat the comparison for each of the groups (e.g., windows) of a feature map and/or across some or all of the feature maps such that some or all grid cells of the feature maps are compared/updated based on comparisons with features from other grid cells in the same group (e.g., window or region).

As described above, with reference to the self-attention of object queries, in some cases, the ROI stage 518 may generate a matrix that includes some or all of the grid cells within a group. The ROI stage 518 may then determine a weight or probabilistic relationship between the grid cells and include the weight in the matrix. The ROI stage 518 may use the weights/relationships in the matrix (indicative of a relationship or weight between grid cells) to calculate updated values for the features of the different grid cells. For example, the ROI stage 518 may update a particular value of a particular grid cell using corresponding weighted values of some or all of the other grid cells in the group. An example of such a matrix and calculation (but for object queries) is described herein with reference to the self-attention of object queries. Moreover, this process may be repeated across some or all of the groups of grid cells of a feature map and across some or all of the feature maps. For example, the image feature extractor 504 may generate multiple feature maps for each image with each feature map corresponding to one or more detected characteristics of the image. In some such cases, the windows (or other form of grouping) may be applied to some or all of the feature maps and the grid cells of the feature maps updated as described herein.

In some cases, the attention stage 506 may include multiple layers of the ROI stage 518. In some such cases, the groups (e.g., windows) in the different layers of the ROI stage 518 may be different. In some cases, the windows may be sized and/or positioned differently. For example, as illustrated by the windows 558 (individual windows referred to as 558a, 554b, etc.) on feature maps 555 of FIG. 5C, the windows 558 in a second layer of an attention stage 506 may be offset from the windows 556 in the first layer of the attention stage 506.

In certain cases where the windows in different layers are offset from each other, alternating layers may use the same or different positions. For example, in an attention stage 506 with six layers, the odd numbered layers (e.g., layers one, three, and five) may be aligned similar to the windows 556 of FIG. 5C and the even numbered layers (e.g., layers two, four, and six) may be aligned similar to the windows 558 of FIG. 5C. It will be understood, however, that the windows in the different layers may be offset from each other as desired. In some cases, each layer may have a different offset from the other layers. For example, in an attention stage 506 with six layers, the layers may be offset from each other by ⅙ of the size of the image such that the windows progress through the entire image.

In some cases, the boundary of a window may overlap and/or wrap around multiple feature maps 555. For example, as illustrated in FIG. 5C, the window 558b is on the bottom right side of a first feature map 555f and on the top left of a second feature map 555a. In the illustrated example of FIG. 5C, the windows 556, 558 at different layers are offset from each other in multiple directions (horizontally and vertically), however, it will be understood that the windows 556, 558 at different layers may be offset from each other in other ways (e.g., unidirectionally).

By offsetting windows in different layers, the attention stage 506 may improve the enrichment of the feature maps. For example, as grid cells within window 556a are compared and used to enrich each other at one layer, those enrichments may be propagated to grid cells within the window 558a and 558b in a subsequent layer. In this way enrichments may be propagated across the grid cells of the feature maps.

Figure 5D:
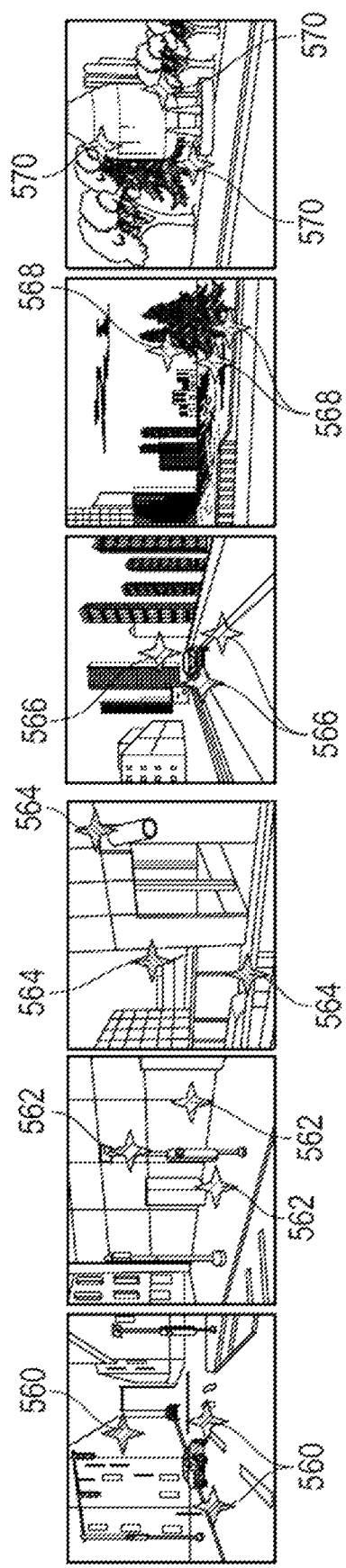
FIG. 5D is a diagram illustrating an example of groups of grid cells feature maps corresponding to different images.

As referenced above, in certain cases, the ROI stage 518 may use points of interest to enrich the feature maps. For example, the feature maps generated by the image feature extractor 504 may include indications of objects in a scene, such as but not limited to pedestrians, bicycle, motorcycles, vehicles, construction cones, etc. Moreover, the grid cells of the feature maps may indicate an outline of the objects. In some such cases, the ROI stage 518 may use grid cells that correspond to the outline of the objects as the group of grid cells for self-attention (e.g., rather grid cells within a window). For example, the ROI stage 518 may compare the features of the grid cells that correspond to the outline of the object to determine a relationship (e.g., a correlation or weight) between the grid cells and then update the features of the grid cells based on the determined relationship as described herein. By using grid cells associated with an outline of potential objects (rather than grid cells within a window), the ROI stage 518 may further reduce the computational time and resources used to determine bounding boxes for the objects. For example, rather than the group of grid cells including the grid cells that form an area of a window, the ROI stage 518 may use the grid cells that form a perimeter or outline of an object. An example of different groups of grid cells within different feature maps that indicate points of interest (e.g., outline of an object) is shown by the groups of grid cells 560, 562, 564, 566, 568, 570 of FIG. 5D. In the illustrated example of FIG. 5D, each group of grid cells 560, 562, 564, 566, 568, 570 includes grid cells that may include portions of the same object (e.g., grid cells on an outline of an object). Although the illustrated example is shown with three points of interest for each group of grid cells, it will be understood that fewer or more points of interest may be included in a group of grid cells. For example, the group of grid cells may include twenty, thirty, fifty, or more grid cells that form at least part of an outline of an object.

Bird's-Eye View Stage

The BEV stage 508 may combine outputs from different stages of the attention stage 506. For example, the BEV stage 508 may combine or correlate (or cross-attend) one more enriched object queries output from the object query self-attention stage 514 with one or more enriched feature maps output from the multi-view stage 516 and/or ROI stage 518 (or a BEV feature map generated from the enriched feature maps).

In the illustrated example of FIG. 5A, the BEV stage 508 includes a BEV generator 520 and a cross-attention stage 522. It will be understood, however, that the BEV stage 508 may include fewer or more components.

The BEV generator 520 may be implemented using an image to BEV encoder, such as a Lift, Splat, Shoot encoder, an example of which is described in "Lift, Splat, Shoot: Encoding Images from Arbitrary Camera Rigs by Implicitly Unprojecting to 3D," Philion et al., 13 Aug. 2020 (arXiv: 2008.05711v1), incorporated herein by reference. In some cases, the BEV generator 520 converts the enriched feature maps output by the attention stage 506 into a BEV feature map. In converting the enriched feature maps to a BEV feature map, the BEV generator 520 may relate or group grid cells from the enriched feature maps that map to the same grid cell of the BEV feature map. Accordingly, in some cases multiple grid cells from the enriched feature maps may be mapped to the same grid cell of the BEV feature map.

The cross-attention stage 522 may enrich the enriched object queries received from the attention stage 506 using the BEV feature map and vice versa. In some cases, as part of cross-attending the enriched object queries, the cross-attention stage 522 identifies grid cells of the BEV feature map that correspond to the enriched object queries and uses the values of the identified BEV grid cells to modify the values of the object queries. As described herein, in some cases, the cross-attention stage 522 may determine a location associated with the enriched object queries (e.g., using a linear layer) and identify a relevant BEV grid cell based on the determined location. For example, the cross-attention stage 522 may multiply a tensor [1, N] corresponding to the enriched object query by a learnable linear layer matrix [N, 3] to determine a location in the BEV feature map that corresponds to a grid cell to be correlated with the enriched object query. In some cases, the cross-attention stage 522 may use multiple BEV grid cells of the BEV feature map to modify or enrich the values of the object queries.

In like manner, the cross-attention stage 522 may enrich the BEV feature map with information from the object queries. For example, in some cases, each grid cell of the BEV feature map may be treated as a BEV object query. Accordingly, enriched object queries that correspond to a grid cell of the BEV feature map may be used to modify/update the corresponding BEV grid cell. For example, features of the enriched object queries that map to a particular BEV grid cell may be used to modify/update the features of the particular BEV grid cell (e.g., using weighted values).

Detection Stage

The detection stage 510 uses the output of the cross-attention stage 522 to determine bounding boxes for object queries, and may be implemented using a detector, such as the CenterPoint Detector, an example of which is described in "Center-based 3D Object Detection and Tracking," Yin et al., 6 Jan. 2021 (arXiv:2006.11275v2).

Fewer, more or different components may be used as part of the perception system 402. For example, in some cases, the perception system 402 may omit the BEV stage 508. In some such cases, enriched object queries output by the attention stage 506 may be communicated to the detection stage 510 to detect bounding boxes 512. As another example, in some cases, the object query cross-attention stage 513, the multi-view stage 516, and/or the ROI stage 518 may be omitted. In some such cases, feature maps generated by the image feature extractor 504 may be communicated to the BEV stage 508, and the BEV stage 508 may generate a BEV feature map (e.g., using the BEV generator 520) and cross-attend object queries (e.g., received from the attention stage 506) with the BEV feature map. As another example, in certain cases, the multi-view stage 516, and/or the ROI stage 518 may be omitted or combined. For example, the feature maps generated by the image feature extractor 504 may be enriched in one or more layers using one of or a combination of the multi-view stage 516, and/or the ROI stage 518.

Figure 6:
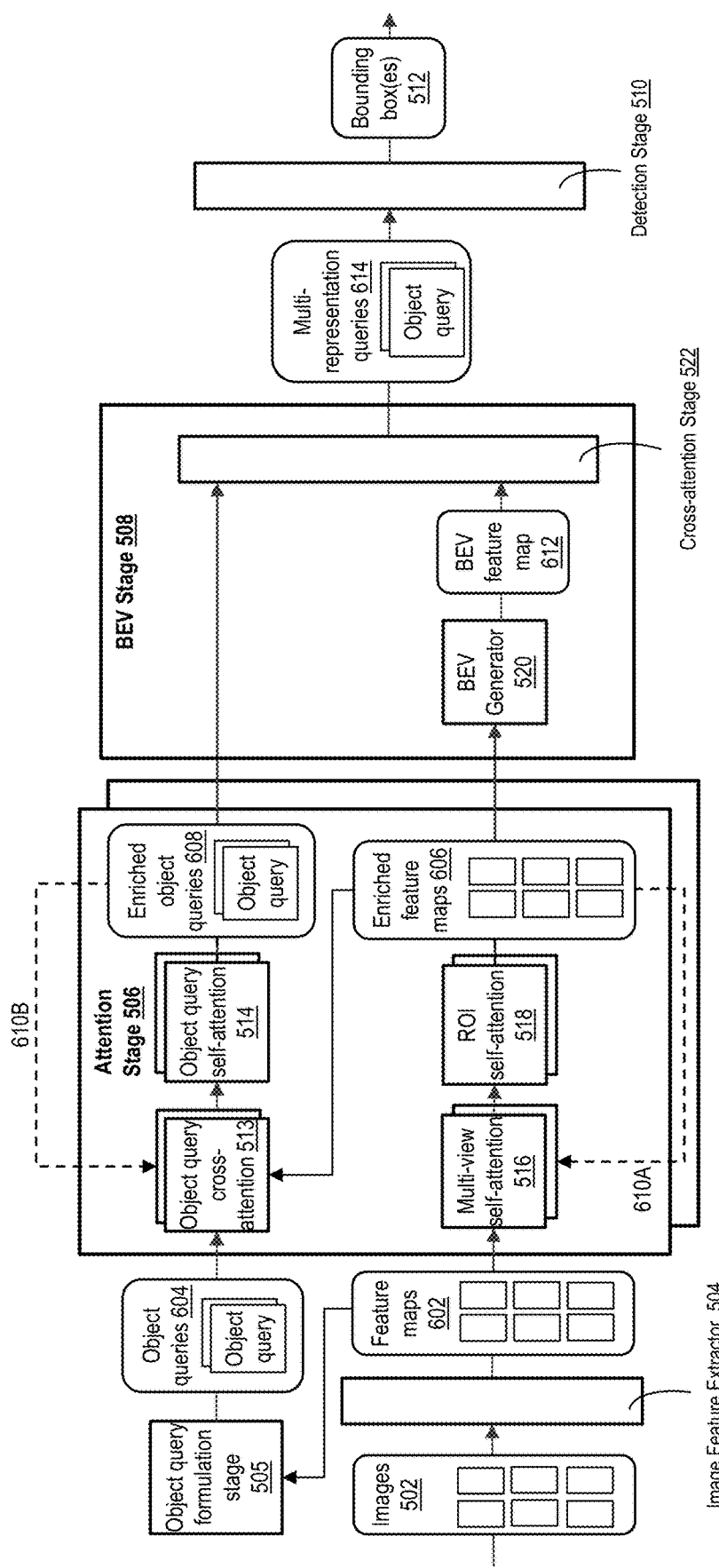
FIG. 6 is a data flow diagram illustrating an example of a perception environment in which a perception system generates bounding boxes from images.

FIG. 6 is a data flow diagram illustrating an example of a perception environment 600 in which a perception system 402 generates bounding boxes 512 from images 502. In the illustrated example, two general data paths are shown: an object query data path and a feature map data path. While there is crossover of data between the two general data paths, for simplicity, the feature map data path (inclusive of the images 502, image feature extractor 504, feature maps 602, the multi-view stage 516, ROI stage 518, and enriched feature maps 606) will be described first followed by the object query data path (inclusive of the formulation stage 505, object queries 604, object query cross-attention stage 513, object query self-attention stage 514, and enriched object queries 608).

As described herein, the images 502 may correspond to images received from different cameras (or other image sensors) around the ego vehicle. In the illustrated example, six images are shown, however, it will be understood that fewer or more images can be used. The images 502 may correspond to images taken at the same (or approximately same) time (e.g., within milliseconds of each other). In this way, the images may correspond to the same scene for the vehicle. Moreover, the perception system 402 may repeatedly receive images and perform the functions described herein multiple times per second as new images are received. Accordingly, it will be understood that the perception system 402 may operate in real-time or near real-time to generate bounding boxes 512 from the images 502.

As described herein, the image feature extractor 504 generates feature maps 602 from the images 502. In the illustrated example, the image feature extractor 504 generates one feature map from each of the images 502, however, it will be understood that the image feature extractor 504 may generate multiple feature maps 602 from each image of the images 502 and communicate the multiple feature maps 602 to the attention stage 506.

Each feature map of the feature maps 602 may include an array of grid cells having a particular channel depth. The grid cells may include semantic data (or features) extracted from (pixels in) the image(s) from which the feature map was generated. The features may be organized as a vector or some other tensor shape. For example, the features (or semantic data) of a grid cell may indicate a shape, light, texture, reflectivity, edge, object class, location, etc. of something detected by the image feature extractor 504.

The multi-view stage 516 and the ROI stage 518 enrich the feature maps to form enriched feature maps 606. In some cases, the multi-view stage 516 and the ROI stage 518 may enrich the feature maps by modifying features in a grid cell using features from another grid cell (and vice versa). As described herein, the multi-view stage 516 and/or the ROI stage 518 may cross-correlate features in grid cells within different groups (e.g., windows) of the enriched feature maps 606. In some cases, groups of grid cells (e.g., windows) used by the multi-view stage 516 may be different (e.g., in shape, quantity, or placement) than groups of grid cells (e.g., windows) used by the ROI stage 518.

Moreover, one or more of the groups of grid cells may overlap multiple feature maps such that grid cells in one feature map are cross correlated with grid cells from another feature map. In some such cases, the multi-view stage 516 and/or ROI stage 518 may use windows that overlap feature maps 602 that correspond to images from cameras that are next to each other (e.g., one window may overlap a feature map corresponding to a front-view image of the vehicle and a feature map corresponding to a front-left view of the vehicle). Accordingly, features from grid cells in one feature map may be propagated to (or correlated with) features from grid cells in another (e.g., neighboring, adjoining, or bordering) feature map.

As described herein, there may be multiple layers of the multi-view stage 516 and/or ROI stage 518 such that enriched feature maps 606 generated by a first layer are communicated to a second layer (as illustrated by the dashed line 610A) and so on. In some cases, there may be 2, 4, 6, or more layers.

The parameters or configurations of the multi-view stage 516 and/or the ROI stage 518 in the different layers may the same or different. For example, weights or nodes in a first layer multi-view stage 516 and/or ROI stage 518 may differ from the weights or nodes in a second layer multi-view stage 516 and/or ROI stage 518.

In addition, the groups of grid cells (e.g., windows) used for self-attending grid cells in one layer may differ from the groups of grid cells in another layer. For example, the groups of grid cells used by the multi-view stage 516 in a first layer may differ from the groups of grid cells used in a second layer. In some cases, the windows used by the multi-view stage 516 in a second layer may be shifted in one or more directions relative to windows used by the multi-view stage 516 in the first layer. Subsequent layers may include additional shifts or oscillate between the placement of windows in the first layer and the placement of windows in the second layer. In certain cases, windows in different layers of the multi-view stage 516 may be shifted differently than the windows in different layers of the ROI stage 518. For example, windows in different layers of the multi-view stage 516 may be shifted in one direction (e.g., horizontally) and windows in different layers of the ROI stage 518 may be shifted in multiple directions (e.g., vertically and horizontally). Moreover, depending on how the windows are aligned, a portion of a window may include opposite ends or corners of feature maps. For example, a window may include a bottom right corner of one feature map and a top left corner of another (e.g., adjoining or neighboring) feature map.

With reference to the object query data path, the formulation stage 505 generates object queries 604. As described herein, the formulation stage 505 may generate and/or initialize the object queries 604 concurrent to the image feature extractor 504 generating the feature maps 602. As described herein, in generating the object queries 604, the formulation stage 505 may initialize the features of the object queries randomly or pseudo randomly.

The formulation stage 505 may also use features from the feature maps 602, other feature maps (e.g., from a localization network) or other data (e.g., heat map data associated with a heatmap), etc., to generate the object queries 604. In some cases, the formulation stage 505 may include a cross-attention stage to identify grid cells (e.g., of the feature maps 602) that correspond to an object query and use the features of the identified grid cell(s) to modify the features of the object query. As described herein, in some cases, this may include using a linear layer matrix to identify a grid cell, and cross-attending the features of the identified grid cell with the features of the object query using weighted features of the grid cell. In addition, in some cases, the formulation stage 505 may include a self-attention stage to enable the grid cells to cross-correlate or associate features and update themselves.

The formulation stage 505 communicates the object queries 604 to the attention stage 506 for further processing. (e.g., the object query cross-attention stage 513 of the attention stage 506). As described herein, the object query cross-attention stage 513 may enrich the object queries 604 using grid cells from the enriched feature maps 606. In some cases, the object query cross-attention stage 513 enriches the object queries 604 in a manner that is similar to the way in which the formulation stage 505 generates the object queries 604 using the feature maps 602. For example, the object query cross-attention stage 513 may identify grid cell(s) in the enriched feature maps 606 that correspond to a particular object query of the object queries 604, weight the features, and/or use the (weighted) features of the identified grid cell(s) to modify or enrich the features of the particular object query. In some cases, the object query cross-attention stage 513 may use a similar technique to enrich some or all of the object queries 604.

The object query self-attention stage 514 may further enrich the (enriched) object queries 604 received from the ROI stage 518 to provide the enriched object queries 608. In some cases, the object query self-attention stage 514 enriches the object queries 604 by modifying or correlating (or self-attending) features of the object queries 604 similar to the way in which the multi-view stage 516 and the ROI stage 518 cross-correlate features of grid cells within a group of grid cells (e.g., window). For example, the object query self-attention stage 514 may compare the features of the object queries 604 to determine a probabilistic relationship between them, generate a weighting value based on the probabilistic relationship, and modify the features of one object query based on weighted features (weighted using the weighting value) from other object queries. In some cases, the object query self-attention stage 514 may use a similar technique to enrich some or all of the object queries 604 to provide the enriched object queries 608 such that the semantic data from some or all of the object queries 604 is updated or enriched.

As described herein, there may be multiple layers in the attention stage 506 for the object query cross-attention stage 513 and object query self-attention stage 514 such that enriched object queries 608 generated in a first layer of the attention stage 506 are communicated to a second layer (e.g., a second object query cross-attention stage 513 and/or second object query self-attention stage 514) as illustrated by the dashed line 610B and so on. In some cases, there may be 2, 4, 6, or more layers.

As described herein, once processed by the one or more layers of the attention stage 506, the enriched feature maps 606 and enriched object queries 608 are communicated to the BEV stage 508 for further processing. As described herein, the BEV generator 520 may generate a BEV feature map 612 from the enriched feature maps 606. As described herein, as part of the transformation, multiple grid cells from the same or different enriched feature maps 606 may be mapped to one BEV grid cell of the BEV feature map 612. In this way, the BEV grid cells may include more features or more enriched features than the grid cells of the enriched feature maps 606.

The cross-attention stage 522 enriches the enriched object queries 608 using the BEV feature map 612 (and/or vice versa) to provide multi-representation (MR) queries 614 (also referred to herein as further enriched queries). The multi-representation queries 614 may include some or all of the enriched object queries 608 and/or some or all of the enriched BEV queries from BEV feature map 612. 614. Similar to the way in which the object query cross-attention stage 513 enriches the object queries 604 using the enriched feature maps 606, the cross-attention stage 522 may enrich the enriched object queries 608 using the BEV feature map 612. For example, the cross-attention stage 522 may identify one or more BEV grid cells that correspond to a particular object query (e.g., using a linear layer matrix) and use the features of the identified BEV grid cell(s) to modify the features of the object query. In some such cases, the cross-attention stage 522 may weight the features of the identified BEV grid cell(s) and use the weighted features to determine the features for the respective object query.

In some cases, the cross-attention stage 522 may treat the grid cells (or other portions) of the BEV feature map 612 as object queries (also referred to herein as BEV object queries). In some such cases, the cross-attention stage 522 may use the features from the enriched object queries 608 to enrich the BEV object queries. For example, the cross-attention stage 522 may identify one or more enriched object queries 608 that correspond to a particular BEV grid cell (or BEV object query) (e.g., using a linear layer matrix) and use the features of the identified object queries to modify the features of the BEV object query. In some such cases, the cross-attention stage 522 may weight the features of the identified object queries and use the weighted features to determine the features for the respective BEV object query.

Accordingly, the multi-representation queries 614 may include different types of object queries or different types of representation queries. For example, the multi-representation queries 614 may include enriched object queries from the object query data path (e.g., corresponding to the enriched object queries 608) and enriched BEV object queries (corresponding to one or more grid cells of the BEV feature map 612). In some cases, the enriched object queries 608 (or object queries 604) may also be referred to as floating queries (or a first type of representation queries) as their determined location may change. For example, as the feature values of the object queries (or corresponding tensors) change due to cross-attention and/or self-attention (or other modifications), the combination of the modified object queries with the (same) linear layer matrix may result in a different location being determined. Moreover, as different linear layer matrices may be used to determine a corresponding location of an object query (e.g., at different layers of the attention stage 506), the combination of a different linear layer matrix with an (same or modified) object query may result in a different location being associated with the object query. As such, the location of an object query 604 or enriched object query 608 may vary or "float" to different grid cells of the feature maps 602 and/or enriched feature maps 606. In certain cases, the BEV object queries from the BEV feature map 612 may also be referred to as fixed queries (or a second type of representation queries) because a BEV object query may correspond to (or be the same as) a particular grid cell of the BEV feature map 612. As such, the location associated with a particular BEV object query from the BEV feature map 612 may not change and may therefore be considered "fixed."

By enriching and/or including BEV object queries in the multi-representation queries 614 communicated to the detection stage 510, the detection stage 510 may have more data by which it can generate bounding boxes 512. The (BEV) object queries and/or more enriched object queries may result in more accurate bounding boxes 512.

The detection stage 510 receives the multi-representation queries 614 from the BEV stage 508 and uses the multi-representation queries 614 to generate (3D) bounding boxes 512 for some or all of the object queries. In some cases, the detection stage 510 generates bounding boxes for certain types of object queries (e.g., object queries with an object class of pedestrian, bicycle, vehicle, construction cone, etc.).

Fewer, more, or different components may be used by the perception system 402 to generate bounding boxes 512. In some cases, the attention stage 506 may include one layer. In certain cases, the BEV stage 508 may be omitted and the enriched object queries 608 used by the detection stage 510 to generate the bounding boxes 512. In certain cases, the multi-view stage 516 and/or the ROI stage 518 may be combined or omitted. In some such cases, the feature maps 602 may be used to generate the BEV feature map 612 and/or the object query cross-attention stage 513 may be omitted.

Figure 7:
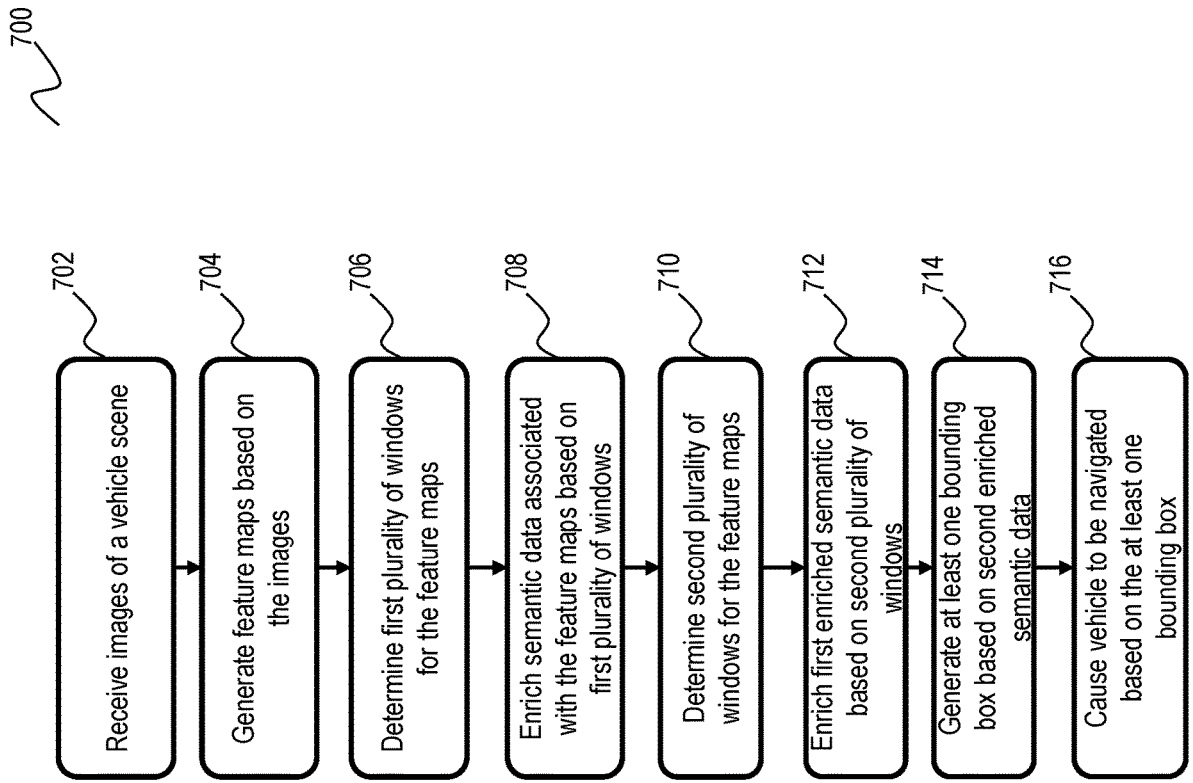
FIG. 7 is a flow diagram illustrating an example of a routine implemented by at least one processor to navigate a vehicle based on at least one bounding box generated from one or more images.

FIG. 7 is a flow diagram illustrating an example of a routine 700 implemented by at least one processor to navigate a vehicle based on at least one bounding box generated from one or more images. The flow diagram illustrated in FIG. 7 is provided for illustrative purposes only. It will be understood that one or more of the steps of the routine illustrated in FIG. 7 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components and/or the autonomous vehicle compute 400 may be used.

At block 702, the perception system 402 receives images of a vehicle scene. As described herein, the images may correspond to different image sensors or cameras located at different positions around the vehicle. In combination, the images may represent a 360-degree view of an environment from the perspective of a vehicle.

At block 704, the perception system 402 generates feature maps based on the images. As described herein, in some cases, the perception system 402 generates at least one feature map for each received image. In some cases, the feature maps include a location relationship corresponding to the images from which they were generated. For example, adjoining or neighboring images may correspond to adjoining or neighboring feature maps. In certain cases, the perception system 402 generates the feature maps using an feature pyramid network such as, but not limited to Resnet or a feature pyramid network (FPN), etc. The feature maps may include an array of grid cells having a particular channel depth (e.g., 256, 512, etc.). As described herein, the grid cells may include features indicative of extracted characteristics of the image, such as but not limited to color, texture, location, reflectivity, shape, edges, etc.

At block 706, the perception system 402 determines a first plurality of windows for the feature maps. As described herein, the first plurality of windows may have a particular size and shape and may cover the entire set of feature maps. In some cases, there may be multiple rows and/or columns of windows with the rows being aligned or offset from one another. In certain cases, one or more windows may cross boundaries of feature maps such that a grid cell from a first feature map and a grid cell from a different feature map are included within the respective window(s).

At block 708, the perception system 402 enriches a set of semantic data associated with the feature maps based on the first plurality of windows to provide a set of first enriched semantic data. As described herein, for some or all of the first plurality of windows, the perception system 402 may cross relate or cross correlate features (semantic data) of grid cells within the respective windows (e.g., based on the placement of the grid cells within the respective windows). For windows that include grid cells spanning multiple feature maps, this may include using the semantic data (e.g., features) from a grid cell in a first feature map to modify or enrich the semantic data (e.g., features) of a grid cell in a second feature map. Accordingly, semantic data from a first grid cell within a first window of the first plurality of windows may be used to modify, enrich, or determine semantic data of a second grid cell (in the same or different feature map) that is also within the first window of the first plurality of windows and vice versa.

In cross relating or correlating the features, the perception system 402 may weight the features of the different grid cells relative to each other (e.g., based on a probabilistic relationship between the grid cells that is based on a comparison of the features of the grid cells) and use the weighted features to determine a new or modified value for a feature of a particular grid cell. In certain cases, in determining the weight between grid cells, the perception system 402 may generate a matrix that includes the grid cells in rows and columns and a weighting value indicative of the relationship between two grid cells (and the weight to be applied to the features from one grid cell to another).

At block 710, the perception system 402 determines a second plurality of windows for the feature maps. As described herein, the second plurality of windows may have a particular size and shape and may cover the entire set of feature maps. In some cases, there may be multiple rows and/or columns of windows with the rows being aligned or offset from one another. In certain cases, a window of the second plurality of windows may cross boundaries of feature maps such that grid cells from two different feature maps are included within the window.

As a non-limiting example, as the second plurality of windows are different from the first plurality of windows, in some cases, a first grid cell may be placed in a first window of the first plurality of windows with a second first grid cell (from the same or different feature map) and a third grid cell (from the same or different feature map as the first or second grid cell) may be placed in a second window of the first plurality of windows, in which case the semantic data of the first grid cell may be used to determine or update semantic data of the second grid cell and vice versa. The first grid cell may then be placed in a third window of the second plurality of windows with the third grid cell and the second grid cell may be placed in a fourth window of the second plurality of windows with a fourth grid cell that may have been in the first or second window of the first plurality of windows.

As described herein, the second plurality of windows may correspond to another stage of the same layer of an attention stage 506 and/or may correspond to the same stage at a different layer of the attention stage 506. For example, if the first plurality of windows corresponds to a multi-view stage 516 of a first layer of the attention stage 506, the second plurality of windows may correspond to a ROI stage 518 of the first layer of the attention stage 506 or to a multi-view stage 516 of a second layer of the attention stage 506.

If the second plurality of windows corresponds to another stage of the same layer, the second plurality of windows may be a different size and/or shape than the first plurality of windows. In addition, the second plurality of windows may be located in a different position from the first plurality of windows. For example, if the first plurality of windows corresponds to a multi-view stage 516 in a first layer and the second plurality of windows corresponds to a ROI stage 518 in the first layer, the second plurality of windows may include fewer or more windows, fewer or more columns or rows, and/or the windows of the second plurality of windows may be sized differently from the first plurality of windows.

If the second plurality of windows corresponds to the same stage of a different layer, the second plurality of windows may be the same size and shape as the first plurality of windows (and include the same number of windows, same number of columns and/or same number of rows), but in a different (shifted) location. For example, if the first plurality of windows corresponds to a multi-view stage 516 in a first layer and the second plurality of windows corresponds to a multi-view stage 516 in a second layer, the second plurality of windows may be shifted horizontally (or vertically as the case may be) relative to the first plurality of windows. As another example, if the first plurality of windows corresponds to a ROI stage 518 in a first layer and the second plurality of windows corresponds to a ROI stage 518 in a second layer, the second plurality of windows may be shifted vertically relative to the first plurality of windows.

At block 712, the perception system 402 enriches the set of first enriched semantic data associated with the feature maps based on the second plurality of windows to provide a set of second enriched semantic data. Similar to the first plurality of windows as described herein at least with reference to block 708, for some or all of the second plurality of windows, the perception system 402 may cross relate or cross correlate features of grid cells within the respective windows (also referred to herein as self-attention). As the second plurality of windows are different from the first plurality of windows, enrichments made to one grid cell may be propagated to additional grid cells.

With continued reference to the example above of the first, second, third, and fourth grid cells, it will be understood that with the placement of the first and third grid cells in the third window of the second plurality of windows, the semantic data of the first grid cell may be used to modify, enrich, and/or determine the semantic data of the third grid cell and vice versa. Similarly, with the placement of the second and fourth grid cells in the fourth window of the second plurality of windows, the semantic data of the second grid cell may be used to modify, enrich, and/or determine the semantic data of the fourth grid cell and vice versa.

At block 714, the perception system 402 generates at least one bounding box based on the set of second enriched semantic data. As described herein, the perception system 402 may generate a bounding box based on the set of second enriched semantic data in a variety of ways. For example, the perception system 402 may use the set of second enriched semantic data at least in part to generate a birds-eye view (BEV) feature map (e.g., after one or more additional round of enrichment of the set of second enriched semantic data) and/or to enrich object queries. The BEV feature map and/or the enriched object queries may be used to determine the at least one bounding box. In some cases, the BEV feature map may be used to further enrich the enriched object queries (and/or vice versa) and the further enriched object queries and/or BEV feature map enriched by the enriched object queries may be used to generate the at least one bounding box.

As described herein, the perception system 402 may use the set of second enriched semantic data at least in part to generate a birds-eye view (BEV) feature map. For example, the perception system 402 may further enrich the set of second enriched semantic data. As part of generating the BEV feature map, the perception system 402 may assign multiple grid cells from the second enriched feature maps (or further enriched grid cells corresponding to the second enriched feature maps after additional stages or layers of enrichment by the perception system 402) to a particular grid cell of the BEV feature map. In certain cases, one or more of the grid cells of the BEV feature map may be treated or considered as an object query or BEV object query. In some such cases, the BEV object queries may be used by the perception system 402 to generate the bounding boxes.

As described herein, the perception system 402 may use the set of second enriched semantic data to enrich object queries. For example, using features of the object queries, the perception system 402 may identify grid cells from the enriched feature maps that correspond to the object queries (e.g., using a linear layer matrix). The identified grid cells may be used to enrich or modify the features of the object queries. Moreover, the perception system 402 may perform a self-attention function on the object queries that it has generated to cross relate and/or correlate the features of the object queries. Similar to the enrichment of the feature maps, the perception system 402 may use multiple layers of enriched feature maps to (further) enrich object queries. The perception system 402 may use the resulting enriched object queries to generate bounding boxes.

As described herein, in some cases, the perception system 402 may use the set of second enriched semantic data to enrich object queries and to generate BEV feature maps. The enriched object queries and BEV feature maps may be used separately or in combination to generate the bounding boxes. In some cases, the enriched object queries may be used to enrich the BEV feature maps and vice versa. The perception system 402 may use the resulting (further) enriched object queries and enriched feature maps (which may include BEV object queries) to generate the bounding boxes.

At block 716, the perception system 402 causes the vehicle to be navigated based on the at least one bounding box. In some cases, the perception system 402 may communicate the bounding boxes to the planning system 404. The planning system 404 may use the bounding boxes to determine how to navigate a vehicle scene.

Fewer, more, or different steps may be included in the routine 700. For example, reference is made to the use of windows and correlating features of grid cells within windows, however, it will be understood that other groups of grid cells may be used, such as, but not limited to, grid cells that correspond to an outline (or approximation of an outline) of an object as described herein at least with reference to FIG. 5D.

In some cases, rather than using a second plurality of windows, the perception system 402 may use multiple points or grid cells of interest to enrich the first enriched semantic data. In some such cases block 710 may be replaced with determining groups of points of interest or groups of grid cells and block 712 may be replaced with enriching the first enriched semantic data based on the groups of points of interest or the groups of grid cells.

Similarly, groups of grid cells or points of interest may be identified and used to enrich the semantic data associated with the feature maps (e.g., replacing blocks 706 and 708). For example, as described herein, at least with reference to FIG. 5D, in some cases, points of interest may be used to identify objects in an image or feature map. In some such cases, groups of points of interest corresponding to the same object (rather than rather than grid cells in the same window) may be self-attended to enrich the first enriched semantic data. As described herein, the groups of points of interest may form an outline or rough outline of an object, in which case points of interest corresponding to a perimeter of an object may be used to enrich the first enriched semantic data rather than points corresponding to an area of an object or an area of a window.

Moreover, the order of steps may be changed and/or some steps may be repeated. For example, if blocks 710 and 712 correspond to different stages of the same layer of an attention stage 506, the perception system 402 may repeat blocks 706-712, corresponding to different layers of the attention stage 506. In some such cases, a third (fifth, seventh, ninth, eleventh, etc.) plurality of windows may have the same size, shape, and number as the first plurality of windows, and may have the same or different position as the first plurality of windows. For example, a third, seventh, eleventh, etc. plurality of windows may have a different position (e.g., shifted vertically and/or horizontally) as the first plurality of windows and a fifth, ninth, etc. plurality of windows may have the same (or a different) position as the first plurality of windows.

For pluralities of windows with the same size, shape, number, and position as the first plurality of windows, the grid cells of the first plurality of windows may further enrich each other. For example, with reference to the first, second, third, and fourth grid cells example, if a subsequent plurality of windows has the same size, shape, number, and position as the first plurality of windows, the semantic data of the first and second grid cells may be used to determine semantic data for each other. Similarly, if a subsequent plurality of windows has the same size, shape, number, and position as the second plurality of windows, the semantic data of the first and third grid cells and the semantic data of the second and fourth grid cells, respectively, may be used to determine semantic data for each other.

Similarly, a fourth (sixth, eighth, tenth, etc.) plurality of windows may have the same size, shape, and number as the second plurality of windows, and may have the same or different position as the second plurality of windows. For example, a fourth, eighth, etc. plurality of windows may have a different position (e.g., shifted vertically and/or horizontally) as the second plurality of windows and a sixth, tenth, etc. plurality of windows may have the same (or a different) position as the second plurality of windows.

As another non-limiting example, if blocks 710 and 712 correspond to the same stage at different layers of an attention stage 506, the perception system 402 may repeat blocks 706-708 and/or blocks 710-712, corresponding to different layers of the attention stage 506. In some such cases, the additional pluralities of windows may have the same size, shape, and number as the first plurality of windows and the second plurality of windows, and may have the same (or different position) as the first plurality of windows or the second plurality of windows. For example, a third, fifth, seventh, ninth, etc. plurality of windows may have the same (or different) position (e.g., shifted vertically and/or horizontally) as the first plurality of windows, and a fourth, sixth, eighth, tenth, etc. plurality of windows may have the same (or a different) position as the second plurality of windows.

Figure 8:
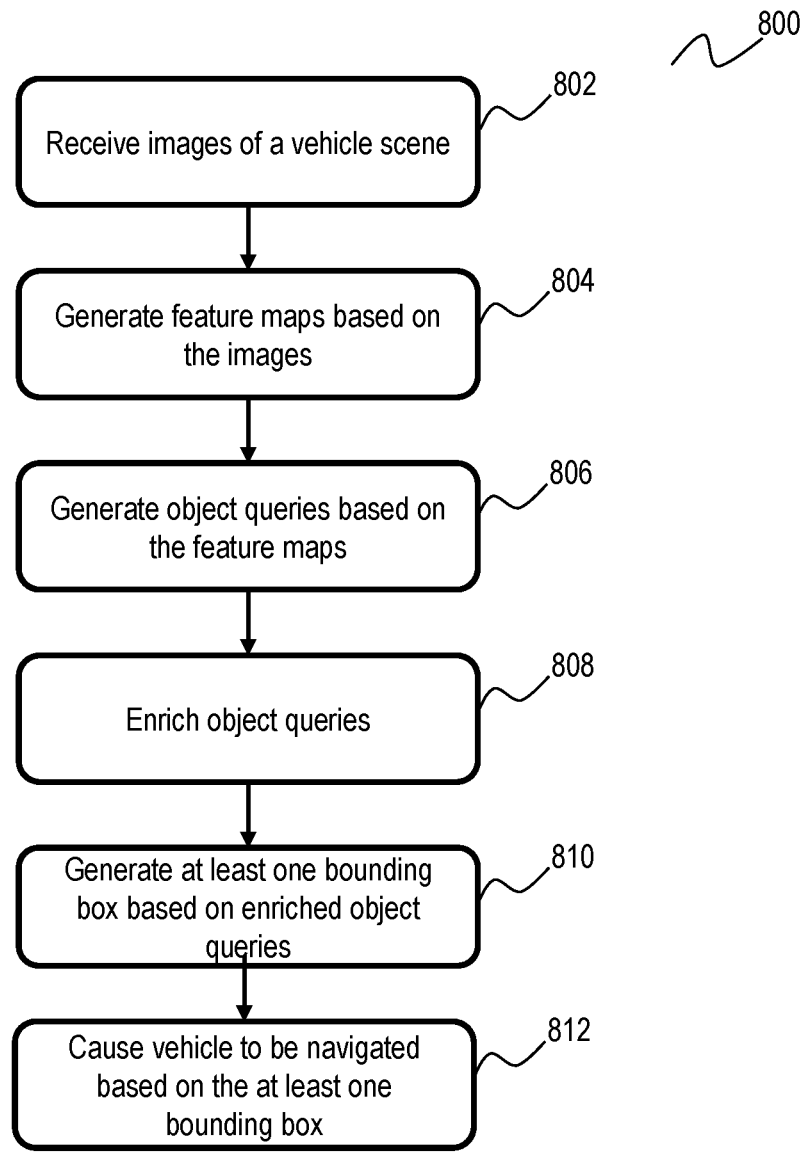
FIG. 8 is a flow diagram illustrating an example of a routine implemented by at least one processor to navigate a vehicle based on at least one bounding box generated from one or more images.

FIG. 8 is a flow diagram illustrating an example of a routine 800 implemented by at least one processor to navigate a vehicle based on at least one bounding box generated from one or more images. The flow diagram illustrated in FIG. 8 is provided for illustrative purposes only. It will be understood that one or more of the steps of the routine illustrated in FIG. 8 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components and/or the autonomous vehicle compute 400 may be used.

At block 802, the perception system 402 receives images of a vehicle scene. As described herein, the images may correspond to different image sensors or cameras located at different positions around the vehicle. In combination, the images may represent a 360-degree view of an environment from the perspective of a vehicle.

At block 804, the perception system 402 generates feature maps based on the images, as described herein at least with reference to block 704 of FIG. 7.

At block 806, the perception system 402 generates object queries based on the feature maps. As described herein, the perception system 402 may use features of a particular object query to identify one or more grid cells from the feature maps that correspond to the particular object query. The perception system 402 may use the identified grid cells to modify the features of the particular object query. In some cases, the perception system 402 may weight the features of the identified one or more grid cells and use the weighted features to modify the features of the particular object query. In a similar way, the perception system 402 may modify the features of some or all of the object queries. In certain cases, as part of generating the object queries, the perception system 402 may use different feature maps (e.g., generated from a localization network that is different from the image feature extractor 504), and/or different data (e.g., heatmap data associated with a heatmap). Moreover, in certain cases, the perception system 402 may cross-attend (e.g., using the feature maps generated at block 804) or self-attend the object queries as part of the generation process.

At block 808, the perception system 402 enriches the object queries. As described herein, the perception system 402 may enrich the object queries in a variety of ways. In some cases, the perception system 402 may enrich the object queries based on any one or any combination of: (enriched) feature maps (non-limiting example described herein at least with reference to object query cross-attention stage 513), features from other object queries (non-limiting example described herein at least with reference to object query self-attention stage 514), and/or one or more BEV feature maps (non-limiting example described herein at least with reference to the cross-attention stage 522). In certain cases, the perception system 402 may enrich the object queries based on features from other object queries and/or a BEV feature map, but not based on enriched feature maps (e.g., enriched feature maps 606). In some such cases, the BEV feature map may be generated from the feature maps generated by an image feature network (e.g., image feature extractor 504).

As described herein, to enrich the object queries based on (enriched) feature maps, the perception system 402 may identify grid cell(s) from the (enriched) feature maps that correspond to the different object queries and use the features of the identified grid cells to enrich or modify the features of the respective object queries.

As described herein, to enrich the object queries based on the features of other object queries, the perception system 402 may perform a self-attention function to determine a relationship between the object queries (e.g., by comparing features of the different object queries). Based on the determined relationship, the perception system 402 may weight the features from the object queries relative to each other and use the weighted features from some or all of the object queries to modify the features of a particular object query.

For example, to enrich a first object query, the perception system 402 may compare the features of the first object query to features of a set of at least one second object query and determine a relationship based on the comparison. The perception system 402 may further determine a weighting value to be applied to features from the set of at least one second object query to generated weighted features from the set of at least one second object query. The perception system 402 may then determine or modify one or more features of the first object query using the weighted values from the set of at least one object query. For example, as described herein, the perception system 402 may multiply the weighting value associated with a second object query by a particular feature of the second object query and use the weighted feature to determine or modify a corresponding feature of the first object query.

As described herein, to enrich the object queries based on a BEV feature map, the perception system 402 may generate a BEV feature map from one or more (enriched) feature maps (e.g., feature maps 602 and/or enriched feature maps 606). The perception system 402 may use the features of the object queries to identify one or more BEV grid cells (or BEV object queries) in the BEV feature map that correspond to the object queries and use the features of the BEV grid cells (or BEV object queries) to modify the features of the respective object queries. In some cases, the features from the BEV grid cells/BEV object queries may be weighted based on a determined relationship between the BEV grid cells/BEV object queries and the respective object queries being modified.

In some cases, the perception system 402 may enrich the object queries based on (enriched) feature maps, features from other object queries and one or more BEV feature maps. A non-limiting example of enriching the object queries based on (enriched) feature maps, features from other object queries and one or more BEV feature maps is described herein at least with reference to FIG. 6.

At block 810, the perception system 402 generates at least one bounding box based on the enriched object queries. As described herein, the perception system 402 may use one or more encoders to identify bounding boxes for objects in an image based on the enriched object queries. In some cases, the perception system 402 may use the enriched object queries and BEV object queries corresponding to one or more BEV grid cells of a BEV feature map. In certain cases, the more object queries used to generate the bounding boxes may result in improved accuracy of the bounding boxes.

At block 812, the perception system 402 causes the vehicle to be navigated based on the at least one bounding box, as described herein at least with reference to block 716 of FIG. 7.

Fewer, more, or different blocks can be used with routine 800. In some cases, any one or any combination of blocks from routine 700 may be combined with blocks from routine 800 or vice versa.

In some cases, the routine 800 may include enriching the BEV feature map using the object queries and/or generating at least one bounding box based on the (enriched) BEV feature map. In certain cases, these functions may be included with routine 800 and/or replace blocks 808 and 810 of the routine 800.

Examples

Various example embodiments of the disclosure can be described by the following clauses:

Clause 1. A method, comprising: receiving a plurality of images from a plurality of image sensors, the plurality of images corresponding to a plurality of views of a scene of a vehicle; generating a plurality of feature maps based on the plurality of images; determining a first plurality of windows for the plurality of feature maps, wherein a first window of the first plurality of windows includes a first grid cell from a first feature map of the plurality of feature maps and a second grid cell from a second feature map of the plurality of feature maps; enriching a set of semantic data associated with the plurality of feature maps based on the first plurality of windows to provide a set of first enriched semantic data, wherein enriching the set of semantic data associated with the plurality of feature maps based on the first plurality of windows comprises determining first semantic data for the first grid cell using second semantic data associated with the second grid cell based on the first grid cell and the second grid cell being included in the first window; determining a second plurality of windows for the plurality of feature maps, wherein a third window of the second plurality of windows includes the first grid cell and a third grid cell and a fourth window of the second plurality of windows includes the second grid cell; enriching the set of first enriched semantic data associated with the plurality of feature maps based on the second plurality of windows to provide a set of second enriched semantic data associated with the plurality of feature maps, wherein enriching the set of first enriched semantic data associated with the plurality of feature maps based on the second plurality of windows comprises determining third semantic data for the first grid cell using fourth semantic data associated with the third grid cell based on the first grid cell and the third grid cell being included in the third window; generating at least one bounding box for an object in the scene of the vehicle based on the set of second enriched semantic data; and causing the vehicle to be controlled based on the at least one bounding box.

Clause 2. The method of clause 1, wherein generating at least one bounding box for an object in the scene of the vehicle based on the set of second enriched semantic data comprises: enriching a set of object queries based on the set of second enriched semantic data to provide a set of enriched object queries; and generating the at least one bounding box based on the set of enriched object queries.

Clause 3. The method of any of clauses 1 or 2, wherein generating at least one bounding box for an object in the scene of the vehicle based on the set of second enriched semantic data comprises: generating a bird's-eye view feature map based on the set of second enriched semantic data; and generating the at least one bounding box based on the bird's-eye view feature map.

Clause 4. The method of any of clauses 1-3, wherein generating at least one bounding box for an object in the scene of the vehicle based on the set of second enriched semantic data comprises: enriching a set of object queries based on the set of second enriched semantic data to provide a set of first enriched object queries; generating a bird's-eye view feature map based on the set of second enriched semantic data; enriching the set of first enriched object queries based on the bird's-eye view feature map to provide a set of second enriched object queries; and generating the at least one bounding box based on the set of second enriched object queries.

Clause 5. The method of any of clauses 1-4, wherein the plurality of image sensors is placed at different orientations around the vehicle.

Clause 6. The method of any of clauses 1-5, wherein the plurality of images provide a 360-degree view around the vehicle.

Clause 7. The method of any of clauses 1-6, wherein the first plurality of windows form at least one row of windows and each of the first plurality of windows is the same width and height.

Clause 8. The method of any of clauses 1-7, wherein the first plurality of windows forms a plurality of rows of windows.

Clause 9. The method of any of clauses 1-8, wherein the second plurality of windows are horizontally shifted relative to the first plurality of windows with respect to the plurality of feature maps.

Clause 10. The method of any of clauses 1-8, wherein the second plurality of windows are vertically and horizontally shifted relative to the first plurality of windows with respect to the plurality of feature maps.

Clause 11. The method of any of clauses 1-8, wherein the second plurality of windows are a different size than the first plurality of windows.

Clause 12. A system, comprising: a data store storing computer-executable instructions; and a processor configured to execute the computer-executable instructions, wherein execution of the computer-executable instructions causes the system to: receive a plurality of images from a plurality of image sensors, the plurality of images corresponding to a plurality of views of a scene of a vehicle; generate a plurality of feature maps based on the plurality of images; determine a first plurality of windows for the plurality of feature maps, wherein a first window of the first plurality of windows includes a first grid cell from a first feature map of the plurality of feature maps and a second grid cell from a second feature map of the plurality of feature maps; enrich a set of semantic data associated with the plurality of feature maps based on the first plurality of windows to provide a set of first enriched semantic data, wherein enriching the set of semantic data associated with the plurality of feature maps based on the first plurality of windows comprises determining first semantic data for the first grid cell using second semantic data associated with the second grid cell based on the first grid cell and the second grid cell being included in the first window; determine a second plurality of windows for the plurality of feature maps, wherein a third window of the second plurality of windows includes the first grid cell and a third grid cell and a fourth window of the second plurality of windows includes the second grid cell; enrich the set of first enriched semantic data associated with the plurality of feature maps based on the second plurality of windows to provide a set of second enriched semantic data associated with the plurality of feature maps, wherein enriching the set of first enriched semantic data associated with the plurality of feature maps based on the second plurality of windows comprises determining third semantic data for the first grid cell using fourth semantic data associated with the third grid cell based on the first grid cell and the third grid cell being included in the third window; generate at least one bounding box for an object in the scene of the vehicle based on the set of second enriched semantic data; and cause the vehicle to be controlled based on the at least one bounding box.

Clause 13. The system of clause 12, wherein to generate at least one bounding box for an object in the scene of the vehicle based on the set of second enriched semantic data, the processor is configured to: enrich a set of object queries based on the set of second enriched semantic data to provide a set of enriched object queries; and generate the at least one bounding box based on the set of enriched object queries.

Clause 14. The system of any of clauses 12 or 13, wherein to generate at least one bounding box for an object in the scene of the vehicle based on the set of second enriched semantic data, the processor is configured to: generate a bird's-eye view feature map based on the set of second enriched semantic data; and generate the at least one bounding box based on the bird's-eye view feature map.

Clause 15. The system of any of clauses 12-14, wherein to generate at least one bounding box for an object in the scene of the vehicle based on the set of second enriched semantic data, the processor is configured to: enrich a set of object queries based on the set of second enriched semantic data to provide a set of first enriched object queries; generate a bird's-eye view feature map based on the set of second enriched semantic data; enrich the set of first enriched object queries based on the bird's-eye view feature map to provide a set of second enriched object queries; and generate the at least one bounding box based on the set of second enriched object queries.

Clause 16. The system of any of clauses 12-15, wherein the second plurality of windows are a different size than the first plurality of windows.

Clause 17. Non-transitory computer-readable media comprising computer-executable instructions that, when executed by a computing system, causes the computing system to: receive a plurality of images from a plurality of image sensors, the plurality of images corresponding to a plurality of views of a scene of a vehicle; generate a plurality of feature maps based on the plurality of images; determine a first plurality of windows for the plurality of feature maps, wherein a first window of the first plurality of windows includes a first grid cell from a first feature map of the plurality of feature maps and a second grid cell from a second feature map of the plurality of feature maps; enrich a set of semantic data associated with the plurality of feature maps based on the first plurality of windows to provide a set of first enriched semantic data, wherein enriching the set of semantic data associated with the plurality of feature maps based on the first plurality of windows comprises determining first semantic data for the first grid cell using second semantic data associated with the second grid cell based on the first grid cell and the second grid cell being included in the first window; determine a second plurality of windows for the plurality of feature maps, wherein a third window of the second plurality of windows includes the first grid cell and a third grid cell and a fourth window of the second plurality of windows includes the second grid cell; enrich the set of first enriched semantic data associated with the plurality of feature maps based on the second plurality of windows to provide a set of second enriched semantic data associated with the plurality of feature maps, wherein enriching the set of first enriched semantic data associated with the plurality of feature maps based on the second plurality of windows comprises determining third semantic data for the first grid cell using fourth semantic data associated with the third grid cell based on the first grid cell and the third grid cell being included in the third window; generate at least one bounding box for an object in the scene of the vehicle based on the set of second enriched semantic data; and cause the vehicle to be controlled based on the at least one bounding box.

Clause 18. The non-transitory computer-readable media of clause 17, wherein to generate at least one bounding box for an object in the scene of the vehicle based on the set of second enriched semantic data, execution of the computer-executable instructions further cause the computing system to: enrich a set of object queries based on the set of second enriched semantic data to provide a set of enriched object queries; and generate the at least one bounding box based on the set of enriched object queries.

Clause 19. The non-transitory computer-readable media of any of clauses 17 or 18, wherein to generate at least one bounding box for an object in the scene of the vehicle based on the set of second enriched semantic data, execution of the computer-executable instructions further cause the computing system to: generate a bird's-eye view feature map based on the set of second enriched semantic data; and generate the at least one bounding box based on the bird's-eye view feature map.

Clause 20. The non-transitory computer-readable media of any of clauses 17-19, wherein to generate at least one bounding box for an object in the scene of the vehicle based on the set of second enriched semantic data, execution of the computer-executable instructions further cause the computing system to: enrich a set of object queries based on the set of second enriched semantic data to provide a set of first enriched object queries; generate a bird's-eye view feature map based on the set of second enriched semantic data; enrich the set of first enriched object queries based on the bird's-eye view feature map to provide a set of second enriched object queries; and generate the at least one bounding box based on the set of second enriched object queries.

Clause 21. A method, comprising: receiving a plurality of images from a plurality of image sensors, the plurality of images corresponding to a plurality of views of a scene of a vehicle; generating a plurality of feature maps based on the plurality of images; generating a plurality of object queries based on the plurality of feature maps; enriching the plurality of object queries using a bird's-eye view feature map to provide a plurality of enriched object queries; generating at least one bounding box for an object in the scene of the vehicle based on the plurality of enriched object queries; and causing the vehicle to be controlled based on the at least one bounding box.

Clause 22. The method of clause 21, wherein enriching the plurality of object queries using a bird's-eye view feature map to provide a plurality of enriched object queries comprises: generating the bird's-eye view feature map based on the plurality of feature maps; and enriching the plurality of object queries based on the bird's-eye view feature map to provide the plurality of enriched object queries.

Clause 23. The method of clause 22, wherein enriching the plurality of object queries based on the bird's-eye view feature map to provide the plurality of enriched object queries comprises: using a linear layer matrix to identify at least one grid cell of the bird's-eye view feature map that corresponds to a first object query of the plurality of object queries; and modifying at least one feature of the first object query based on at least one feature of the at least one grid cell.

Clause 24. The method of any of clauses 21-23, wherein enriching the plurality of object queries using a bird's-eye view feature map to provide a plurality of enriched object queries comprises: determining a relationship between the plurality of object queries based on a comparison of features of the plurality of object queries; generating a weighting value for the plurality of object queries relative to each other based on the determined relationship between the plurality of object queries; and modifying at least one feature of each of the plurality of object queries based on the weighting value.

Clause 25. The method of any of clauses 21-23, wherein enriching the plurality of object queries using a bird's-eye view feature map to provide a plurality of enriched object queries comprises: determining a relationship between a first object query of the plurality of object queries and a second object query of the plurality of object queries based on a comparison of features of the first object query relative to features of the second object query; generating a weighting value for the first object query relative to the second object query based on the determined relationship between the first object query and the second object query; weighting at least one features of the first object query based on the weighting value to provide at least one weighted feature of the first object query; and modifying at least one feature of the second object query based on the at least one weighted feature of the first object query.

Clause 26. The method of any of clauses 21-25, wherein enriching the plurality of object queries using a bird's-eye view feature map to provide a plurality of enriched object queries comprises: generating a plurality of enriched feature maps based on a set of semantic data of the plurality of feature maps; and enriching the plurality of object queries based on the plurality of enriched feature maps.

Clause 27. The method of any of clauses 21, 24, or 25, wherein the plurality of enriched object queries is a plurality of second enriched object queries, wherein enriching the plurality of object queries using a bird's-eye view feature map to provide a plurality of second enriched object queries comprises: generating a plurality of enriched feature maps based on a set of semantic data of the plurality of feature maps; enriching the plurality of object queries based on the plurality of enriched feature maps to provide a plurality of first enriched object queries; generating the bird's-eye view feature map based on the plurality of enriched feature maps; and enriching the plurality of first enriched object queries based on the bird's-eye view feature map to provide the plurality of second enriched object queries.

Clause 28. The method of any of clauses 21-27, wherein the plurality of image sensors is placed at different orientations around the vehicle.

Clause 29. The method of any of clauses 21-28, wherein the plurality of images provide a 360-degree view around the vehicle.

Clause 30. A system, comprising: a data store storing computer-executable instructions; and a processor configured to execute the computer-executable instructions, wherein execution of the computer-executable instructions causes the system to: receive a plurality of images from a plurality of image sensors, the plurality of images corresponding to a plurality of views of a scene of a vehicle; generate a plurality of feature maps based on the plurality of images; generate a plurality of object queries based on the plurality of feature maps; enrich the plurality of object queries using a bird's-eye view feature map to provide a plurality of enriched object queries; generate at least one bounding box for an object in the scene of the vehicle based on the plurality of enriched object queries; and cause the vehicle to be controlled based on the at least one bounding box.

Clause 31. The system of clause 30, wherein to enrich the plurality of object queries using a bird's-eye view feature map to provide a plurality of enriched object queries, the processor is configured to: generating the bird's-eye view feature map based on the plurality of feature maps; and enriching the plurality of object queries based on the bird's-eye view feature map to provide the plurality of enriched object queries.

Clause 32. The system of clause 31, wherein to enrich the plurality of object queries based on the bird's-eye view feature map to provide the plurality of enriched object queries, the processor is configured to: use a linear layer matrix to identify at least one grid cell of the bird's-eye view feature map that corresponds to a first object query of the plurality of object queries; and modify at least one feature of the first object query based on at least one feature of the at least one grid cell.

Clause 33. The system of any of clauses 30-32, wherein to enrich the plurality of object queries using a bird's-eye view feature map to provide a plurality of enriched object queries, the processor is configured to: determine a relationship between the plurality of object queries based on a comparison of features of the plurality of object queries; generate a weighting value for the plurality of object queries relative to each other based on the determined relationship between the plurality of object queries; and modify at least one feature of each of the plurality of object queries based on the weighting value.

Clause 34. The system of any of clauses 30-32, wherein to enrich the plurality of object queries using a bird's-eye view feature map to provide a plurality of enriched object queries, the processor is configured to: determine a relationship between a first object query of the plurality of object queries and a second object query of the plurality of object queries based on a comparison of features of the first object query relative to features of the second object query; generate a weighting value for the first object query relative to the second object query based on the determined relationship between the first object query and the second object query; weight at least one features of the first object query based on the weighting value to provide at least one weighted feature of the first object query; and modify at least one feature of the second object query based on the at least one weighted feature of the first object query.

Clause 35. The system of any of clauses 30-34, wherein enriching the plurality of object queries using a bird's-eye view feature map to provide a plurality of enriched object queries comprises: generating a plurality of enriched feature maps based on a set of semantic data of the plurality of feature maps; and enriching the plurality of object queries based on the plurality of enriched feature maps.

Clause 36. The system of any of clauses 30, 33, or 34, wherein the plurality of enriched object queries is a plurality of second enriched object queries, wherein to enrich the plurality of object queries using a bird's-eye view feature map to provide a plurality of enriched object queries, the processor is configured to: generating a plurality of enriched feature maps based on a set of semantic data of the plurality of feature maps; enriching the plurality of object queries based on the plurality of enriched feature maps to provide a plurality of first enriched object queries; generating the bird's-eye view feature map based on the plurality of enriched feature maps; and enriching the plurality of first enriched object queries based on the bird's-eye view feature map to provide the plurality of second enriched object queries.

Clause 37. Non-transitory computer-readable media comprising computer-executable instructions that, when executed by a computing system, causes the computing system to: receive a plurality of images from a plurality of image sensors, the plurality of images corresponding to a plurality of views of a scene of a vehicle; generate a plurality of feature maps based on the plurality of images; generate a plurality of object queries based on the plurality of feature maps; enrich the plurality of object queries using a bird's- eye view feature map to provide a plurality of enriched object queries; generate at least one bounding box for an object in the scene of the vehicle based on the plurality of enriched object queries; and cause the vehicle to be controlled based on the at least one bounding box.

Clause 38. The non-transitory computer-readable media of clause 37, wherein to enrich the plurality of object queries using a bird's-eye view feature map to provide a plurality of enriched object queries, execution of the computer-executable instructions further cause the computing system to: generate the bird's-eye view feature map based on the plurality of feature maps; and enrich the plurality of object queries based on the bird's-eye view feature map to provide the plurality of enriched object queries.

Clause 39. The non-transitory computer-readable media of clause 38, wherein to enrich the plurality of object queries based on the bird's-eye view feature map to provide the plurality of enriched object queries, execution of the computer-executable instructions further cause the computing system to: use a linear layer matrix to identify at least one grid cell of the bird's-eye view feature map that corresponds to a first object query of the plurality of object queries; and modify at least one feature of the first object query based on at least one feature of the at least one grid cell.

Clause 40. The non-transitory computer-readable media of any of clauses 37-39, wherein to enrich the plurality of object queries using a bird's-eye view feature map to provide a plurality of enriched object queries, execution of the computer-executable instructions further cause the computing system to: determine a relationship between the plurality of object queries based on a comparison of features of the plurality of object queries; generate a weighting value for the plurality of object queries relative to each other based on the determined relationship between the plurality of object queries; and modify at least one feature of each of the plurality of object queries based on the weighting value.

Additional Examples

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method, comprising:
receiving a plurality of images from a plurality of image sensors, the plurality of images corresponding to a plurality of views of a scene of a vehicle;
generating a plurality of feature maps based on the plurality of images;
determining a first plurality of windows for the plurality of feature maps, wherein a first window of the first plurality of windows includes a first grid cell from a first feature map of the plurality of feature maps and a second grid cell from a second feature map of the plurality of feature maps;
enriching a set of semantic data associated with the plurality of feature maps based on the first plurality of windows to provide a set of first enriched semantic data, wherein enriching the set of semantic data associated with the plurality of feature maps based on the first plurality of windows comprises determining first semantic data for the first grid cell using second semantic data associated with the second grid cell based on the first grid cell and the second grid cell being included in the first window;
determining a second plurality of windows for the plurality of feature maps, wherein a third window of the second plurality of windows includes the first grid cell and a third grid cell and a fourth window of the second plurality of windows includes the second grid cell;
enriching the set of first enriched semantic data associated with the plurality of feature maps based on the second plurality of windows to provide a set of second enriched semantic data associated with the plurality of feature maps, wherein enriching the set of first enriched semantic data associated with the plurality of feature maps based on the second plurality of windows comprises determining third semantic data for the first grid cell using fourth semantic data associated with the third grid cell based on the first grid cell and the third grid cell being included in the third window;
generating at least one bounding box for an object in the scene of the vehicle based on the set of second enriched semantic data; and
causing the vehicle to be controlled based on the at least one bounding box.

2. The method of claim 1, wherein generating at least one bounding box for an object in the scene of the vehicle based on the set of second enriched semantic data comprises:
enriching a set of object queries based on the set of second enriched semantic data to provide a set of enriched object queries; and
generating the at least one bounding box based on the set of enriched object queries.

3. The method of claim 1, wherein generating at least one bounding box for an object in the scene of the vehicle based on the set of second enriched semantic data comprises:
generating a bird's-eye view feature map based on the set of second enriched semantic data; and
generating the at least one bounding box based on the bird's-eye view feature map.

4. The method of claim 1, wherein generating at least one bounding box for an object in the scene of the vehicle based on the set of second enriched semantic data comprises:
enriching a set of object queries based on the set of second enriched semantic data to provide a set of first enriched object queries;
generating a bird's-eye view feature map based on the set of second enriched semantic data;
enriching the set of first enriched object queries based on the bird's-eye view feature map to provide a set of second enriched object queries; and
generating the at least one bounding box based on the set of second enriched object queries.

5. The method of claim 1, wherein the plurality of image sensors is placed at different orientations around the vehicle.

6. The method of claim 1, wherein the plurality of images provide a 360-degree view around the vehicle.

7. The method of claim 1, wherein the first plurality of windows form at least one row of windows and each of the first plurality of windows is the same width and height.

8. The method of claim 1, wherein the first plurality of windows forms a plurality of rows of windows.

9. The method of claim 1, wherein the second plurality of windows are horizontally shifted relative to the first plurality of windows with respect to the plurality of feature maps.

10. The method of claim 1, wherein the second plurality of windows are vertically and horizontally shifted relative to the first plurality of windows with respect to the plurality of feature maps.

11. The method of claim 1, wherein the second plurality of windows are a different size than the first plurality of windows.

12. A system, comprising:
a data store storing computer-executable instructions; and
a processor configured to execute the computer-executable instructions, wherein execution of the computer-executable instructions causes the system to:
receive a plurality of images from a plurality of image sensors, the plurality of images corresponding to a plurality of views of a scene of a vehicle;
generate a plurality of feature maps based on the plurality of images;
determine a first plurality of windows for the plurality of feature maps, wherein a first window of the first plurality of windows includes a first grid cell from a first feature map of the plurality of feature maps and a second grid cell from a second feature map of the plurality of feature maps;
enrich a set of semantic data associated with the plurality of feature maps based on the first plurality of windows to provide a set of first enriched semantic data, wherein enriching the set of semantic data associated with the plurality of feature maps based on the first plurality of windows comprises determining first semantic data for the first grid cell using second semantic data associated with the second grid cell based on the first grid cell and the second grid cell being included in the first window;

determine a second plurality of windows for the plurality of feature maps, wherein a third window of the second plurality of windows includes the first grid cell and a third grid cell and a fourth window of the second plurality of windows includes the second grid cell;

enrich the set of first enriched semantic data associated with the plurality of feature maps based on the second plurality of windows to provide a set of second enriched semantic data associated with the plurality of feature maps, wherein enriching the set of first enriched semantic data associated with the plurality of feature maps based on the second plurality of windows comprises determining third semantic data for the first grid cell using fourth semantic data associated with the third grid cell based on the first grid cell and the third grid cell being included in the third window;

generate at least one bounding box for an object in the scene of the vehicle based on the set of second enriched semantic data; and cause the vehicle to be controlled based on the at least one bounding box.

13. The system of claim 12, wherein to generate at least one bounding box for an object in the scene of the vehicle based on the set of second enriched semantic data, the processor is configured to:

enrich a set of object queries based on the set of second enriched semantic data to provide a set of enriched object queries; and generate the at least one bounding box based on the set of enriched object queries.

14. The system of claim 12, wherein to generate at least one bounding box for an object in the scene of the vehicle based on the set of second enriched semantic data, the processor is configured to:

generate a bird's-eye view feature map based on the set of second enriched semantic data; and generate the at least one bounding box based on the bird's-eye view feature map.

15. The system of claim 12, wherein to generate at least one bounding box for an object in the scene of the vehicle based on the set of second enriched semantic data, the processor is configured to:

enrich a set of object queries based on the set of second enriched semantic data to provide a set of first enriched object queries;

generate a bird's-eye view feature map based on the set of second enriched semantic data;

enrich the set of first enriched object queries based on the bird's-eye view feature map to provide a set of second enriched object queries; and generate the at least one bounding box based on the set of second enriched object queries.

16. The system of claim 12, wherein the second plurality of windows are a different size than the first plurality of windows.

17. Non-transitory computer-readable media comprising computer-executable instructions that, when executed by a computing system, causes the computing system to:

receive a plurality of images from a plurality of image sensors, the plurality of images corresponding to a plurality of views of a scene of a vehicle;

generate a plurality of feature maps based on the plurality of images;

determine a first plurality of windows for the plurality of feature maps, wherein a first window of the first plurality of windows includes a first grid cell from a first feature map of the plurality of feature maps and a second grid cell from a second feature map of the plurality of feature maps;

enrich a set of semantic data associated with the plurality of feature maps based on the first plurality of windows to provide a set of first enriched semantic data, wherein enriching the set of semantic data associated with the plurality of feature maps based on the first plurality of windows comprises determining first semantic data for the first grid cell using second semantic data associated with the second grid cell based on the first grid cell and the second grid cell being included in the first window;

determine a second plurality of windows for the plurality of feature maps, wherein a third window of the second plurality of windows includes the first grid cell and a third grid cell and a fourth window of the second plurality of windows includes the second grid cell;

enrich the set of first enriched semantic data associated with the plurality of feature maps based on the second plurality of windows to provide a set of second enriched semantic data associated with the plurality of feature maps, wherein enriching the set of first enriched semantic data associated with the plurality of feature maps based on the second plurality of windows comprises determining third semantic data for the first grid cell using fourth semantic data associated with the third grid cell based on the first grid cell and the third grid cell being included in the third window;

generate at least one bounding box for an object in the scene of the vehicle based on the set of second enriched semantic data; and cause the vehicle to be controlled based on the at least one bounding box.

18. The non-transitory computer-readable media of claim 17, wherein to generate at least one bounding box for an object in the scene of the vehicle based on the set of second enriched semantic data, execution of the computer-executable instructions further cause the computing system to:

enrich a set of object queries based on the set of second enriched semantic data to provide a set of enriched object queries; and generate the at least one bounding box based on the set of enriched object queries.

19. The non-transitory computer-readable media of claim 17, wherein to generate at least one bounding box for an object in the scene of the vehicle based on the set of second enriched semantic data, execution of the computer-executable instructions further cause the computing system to:

generate a bird's-eye view feature map based on the set of second enriched semantic data; and generate the at least one bounding box based on the bird's-eye view feature map.

20. The non-transitory computer-readable media of claim 17, wherein to generate at least one bounding box for an object in the scene of the vehicle based on the set of second enriched semantic data, execution of the computer-executable instructions further cause the computing system to:
- enrich a set of object queries based on the set of second enriched semantic data to provide a set of first enriched object queries;
- generate a bird's-eye view feature map based on the set of second enriched semantic data;
- enrich the set of first enriched object queries based on the bird's-eye view feature map to provide a set of second enriched object queries; and
- generate the at least one bounding box based on the set of second enriched object queries.

* * * * *